(12) United States Patent
Valadarsky et al.

(10) Patent No.: US 7,043,661 B2
(45) Date of Patent: May 9, 2006

(54) TOPOLOGY-BASED REASONING APPARATUS FOR ROOT-CAUSE ANALYSIS OF NETWORK FAULTS

(75) Inventors: Doron Valadarsky, Hod Hasharon (IL); Adir Pridor, Beer Sheva (IL); Nir Kaftan, Hod Hasharon (IL); Shlomo Mallal, Jerusalem (IL); Alexander Pavlenko, Bat Yam (IL); Yuval Lifshitz, Menorah (IL); Lev Bregman, Beer Sheva (IL); Alexander Virtser, Tel Aviv (IL); Igor Kouperchimdt, Petach Tikva (IL)

(73) Assignee: TTI-Team Telecom International Ltd., Petach Tikva (IL)

( * ) Notice: Subject to any disclaimer, the term of this patent is extended or adjusted under 35 U.S.C. 154(b) by 736 days.

(21) Appl. No.: 09/978,846

(22) Filed: Oct. 17, 2001

(65) Prior Publication Data

US 2002/0111755 A1 Aug. 15, 2002

Related U.S. Application Data

(60) Provisional application No. 60/241,647, filed on Oct. 19, 2000, provisional application No. 60/241,365, filed on Oct. 19, 2000, and provisional application No. 60/240,617, filed on Oct. 19, 2000.

(51) Int. Cl.
*G06F 11/00* (2006.01)

(52) U.S. Cl. .......................... 714/4; 379/15.05; 702/59; 714/43

(58) Field of Classification Search ................ 714/4, 714/43; 702/58, 59; 379/15.05; 709/318
See application file for complete search history.

(56) References Cited

U.S. PATENT DOCUMENTS

| | | | |
|---|---|---|---|
| 5,309,448 A | * | 5/1994 | Bouloutas et al. ............ 714/25 |
| 5,392,328 A | | 2/1995 | Schmidt et al. ............... 379/10 |
| 5,646,864 A | | 7/1997 | Whitney ................. 364/514 B |
| 5,661,668 A | | 8/1997 | Yemini et al. .............. 364/550 |
| 5,737,319 A | * | 4/1998 | Croslin et al. .............. 370/255 |

(Continued)

FOREIGN PATENT DOCUMENTS

| | | |
|---|---|---|
| CA | 2323195 | 4/2001 |
| EP | 549937 | 7/1993 |
| EP | 686329 | 12/1995 |
| GB | 2318479 | 4/1998 |
| JP | 2000020428 | 1/2000 |
| WO | WO 94/19887 | 9/1994 |
| WO | WO 94/19912 | 9/1994 |
| WO | WO 95/32411 | 11/1995 |
| WO | WO 99/13427 | 3/1999 |
| WO | WO 99/49474 | 9/1999 |
| WO | WO 00/33205 | 6/2000 |
| WO | WO 00/39674 | 7/2000 |
| WO | WO 01/22226 | 3/2001 |
| WO | WO 01/31411 | 5/2001 |

OTHER PUBLICATIONS

Derwent English Abstract of JP 2000 20428 dated Jan. 21, 2000.

*Primary Examiner*—Robert Beausoliel
*Assistant Examiner*—Christopher McCarthy
(74) *Attorney, Agent, or Firm*—Ladas & Parry

(57) ABSTRACT

A root cause analysis system operative in conjunction with fault management apparatus, the system includes a topology-based reasoning system (TRS) operative to topologically analyze alarms in order to identify at least one root cause thereof.

51 Claims, 15 Drawing Sheets

U.S. PATENT DOCUMENTS

| | | | |
|---|---|---|---|
| 5,748,098 A | * 5/1998 | Grace | 370/242 |
| 5,771,274 A | 6/1998 | Harris | 379/26 |
| 5,864,662 A | 1/1999 | Brownmiller et al. | 395/183.19 |
| 5,946,373 A | 8/1999 | Harris | 379/26 |
| 5,995,485 A | 11/1999 | Croslin | 370/216 |
| 6,026,442 A | 2/2000 | Lewis et al. | 709/229 |
| 6,072,777 A | 6/2000 | Bencheck et al. | 370/244 |
| 6,118,936 A | * 9/2000 | Lauer et al. | 709/224 |
| 6,249,755 B1 | 6/2001 | Yemini et al. | 702/183 |
| 6,430,712 B1 | * 8/2002 | Lewis | 714/47 |
| 6,445,774 B1 | * 9/2002 | Kidder et al. | 379/9.03 |
| 6,707,795 B1 | * 3/2004 | Noorhosseini et al. | 370/242 |
| 6,766,368 B1 | * 7/2004 | Jakobson et al. | 709/224 |
| 2001/0051937 A1 | * 12/2001 | Ross et al. | 706/47 |

* cited by examiner

US 7,043,661 B2

TOPOLOGY-BASED REASONING APPARATUS FOR ROOT-CAUSE ANALYSIS OF NETWORK FAULTS

This application claims the benefit of U.S. Provisional Application(s) No(s).: 60/241,365 Oct. 19, 2000 60/241,647 Oct. 19, 2000 60/240,617 Oct. 19, 2000 and incorporates the same by reference.

FIELD OF THE INVENTION

The present invention relates to apparatus and methods for fault management.

BACKGROUND OF THE INVENTION

The state of the art in fault management systems and technologies related thereto is represented by the following documents:

Canadian Patent Application No. 2323195 A1; European Paten Application No. 549937 A; European Patent Application No. 686329 B; United Kingdom Application No. 2318479 A; Japanese Patent Application No. 2000020428 A; U.S. Pat. No. 5,309,448 A; U.S. Pat. No. 5,392,328 A; U.S. Pat. No. 5,646,864 A; U.S. Pat. No. 5,661,668 A; U.S. Pat. No. 5,864,662 A; U.S. Pat. No. 5,946,373 A; U.S. Pat. No. 6,072,777 A; U.S. Pat. No. 6,118,936 A; U.S. Pat. No. 6,249,755 B1; WO 200039674 A1; WO 200122226 A1, WO 9419897 A; WO 9419912 A; WO 9532411; WO 9913427 A2 and WO 9949474 A1

The disclosures of all publications mentioned in the specification and of the publications cited therein are hereby incorporated by reference.

SUMMARY OF THE INVENTION

The present invention seeks to provide an improved fault management system by use of a root cause analysis mechanism.

There is thus provided in accordance with a preferred embodiment of the present invention a fault management system having one, some or all of the following features:

Correlator+TRS is based on fault propagation rules and topological network information.

The topology is translated to a graph onto which the incoming alarms and expected alarm behavior are coordinated. This graph is scanned in real time in order to find the right root-cause. The graph is used rather than a matrix, in order to handle large networks.

The graph and all other critical information are held in memory (RAM) to facilitate high performance.

TRS is capable of finding root causes for more than one malfunction simultaneously.

The correlation TRS checks all suspected probable causes before selecting the most adequate root-cause.

Correlation TRS makes root-cause decisions based on three parameters;

The distance between the location in the network of the suspected root-cause and the point of origin of each alarm related to it.

Number of alarms in the incoming group of alarms that are explained by that root-cause.

Number of alarms received out of all the alarms that system expects for that root cause.

TRS can deduct the correct root cause even when some expected alarms are missing from the incoming alarm stream.

TRS can identify incoming alarms that were generated by maintenance activities.

TRS is independent of a specific type of network and it can be used on any type of network by adding a TRS rule-set.

TRS can support manufacture dependent anomalies. For example there can be, for the same type of network problem and equipment class, a different rule for equipment manufacture x and a different rule for equipment manufacture y. Both rules can coexist on the system simultaneously.

TRS can change its decision according to new alarms that have arrived after the decision was first made.

TRS uses graph traverse in order to find the root cause and in order to find all the alarms that belong to a root cause.

TRS divides (clusters) the stream of alarms into groups according to the time they arrive and the way the group acts. (The alarm has a statistic way of arrival, and TRS uses this information in order to find the right groups).

TRS uses topologic distance between the alarms in order to make the groups.

TRS updates its network topology data on-line—there is no disruption to system operation.

TRS gives the user a friendly interface in order to define the rules. (Most correlation systems have much more complex rule definition.)

TRS allow the users to change the rules while TRS is still running.

TRS automatically adjusts to changing network topology.

TRS is designed as a part of a network control system and can be connected to the event system directly.

TRS imitates the flow of alarms as it is in the network, which is why any one with good knowledge of the alarm flow in a given network type can generate the rules for that network type.

TRS issues 'derived' alarms to describe root causes when no incoming alarm accurately does so.

TRS results are preferably sent to the standard Netrac fault management GUI. Operator doesn't need to look at a separate correlation screen.

TRS stores its results in a history database. Users can review the decisions it made, and the alarm groups it correlated, long after the faults that generated those decisions and alarm groups have been resolved.

Correlator+ TRS interworks with Correlator+ ES (which is an expert system based correlation product). Correlator+ may comprise two modules, one using a topology-based reasoning approach, and the other using a classic expert system approach, to ensure the widest fault coverage possible. (Some network faults are best handled by the first approach and others by the second approach). TRS fulfills the topology-based reasoning role and a second module, ES, fulfills the classic expert system role. The former (TRS), as indicated above, uses a topology-based reasoning approach. The later (ES) is built on classic expert system technology. When both are installed together, they interwork as one integrated system.

As opposed to classic Correlation expert systems, the rules defined for the TRS are of a generic nature, independent of the network element instances, The number of rules is therefore much less then the number of rules needed to describe the network in the classical expert systems.

TRS is designed to work in cross-platform and multi-domain networks.

TRS contains a mapping facility that ensures that incoming alarms are mapped to the correct alarming object as identified in the network configuration graph.

Also provided, in accordance with a preferred embodiment of the present invention, is a root cause analysis system operative in conjunction with fault management apparatus, the system including a topology-based reasoning system (TRS) operative to topologically analyze alarms in order to identify at least one root cause thereof.

Further in accordance with a preferred embodiment of the present invention, the faults occur in a network such as a data communications network or telecommunications network.

Still further in accordance with a preferred embodiment of the present invention, the system also includes fault management apparatus.

Further in accordance with a preferred embodiment of the present invention, the system also includes a rule-based expert system (ES) operative to analyze alarms in order to identify root causes thereof.

Further in accordance with a preferred embodiment of the present invention, the operation of TRS is at least partly rule-based or at least partly relation-based.

Additionally in accordance with a preferred embodiment of the present invention, the TRS is operative to represent the topology of a network being analyzed for faults as a graph.

Further in accordance with a preferred embodiment of the present invention, the system also includes a large network, such as a national network, whose topology is being analyzed.

Further in accordance with a preferred embodiment of the present invention, the graph is held in memory such as random access memory.

Still further in accordance with a preferred embodiment of the present invention, the large network includes a network operated by PTT (post-telecom and telegraph).

Additionally in accordance with a preferred embodiment of the present invention, the TRS is operative to identify root causes for more than one network fault simultaneously.

Still further in accordance with at preferred embodiment of the present invention, the TRS is operative to check all probable causes before selecting a root-cause.

Further in accordance with a preferred embodiment of the present invention, conditional probabilities derived from assuming that various probable causes are the root cause, are compared, in order to select one of the probable causes as the root cause.

Additionally in accordance with a preferred embodiment of the present invention, the TRS is operative to make at least one root-cause decision based at least partly on at least one of the following parameters; the distance between the location in the network of the suspected root-cause and the point of origin of each alarm related to it, the amount of alarms in the incoming group of alarms, that are explained by that root-cause, and the amount of alarm received out of all the alarms that system expects for that root cause.

Still further in accordance with a preferred embodiment of the present invention, the TRS is operative to anticipate at least one expected alarm associated with at least one respective fault type, and wherein the TRS is capable of deciding that at least one particular fault type has occurred, even if less than all of the expected alarms associated with the at least one particular fault type have actually occurred within an incoming alarm stream.

Additionally in accordance with a preferred embodiment of the present invention, the TRS is operative to identify at least one incoming alarms generated by at least one network maintenance activity.

Still further in accordance with a preferred embodiment of the present invention, the TRS is application independent.

Also provided, in accordance with another preferred embodiment of the present invention, is a root cause analysis method operative in conjunction with fault management apparatus, the method including performing topology-based reasoning including topologically analyzing alarms in order to identify at least one root cause thereof.

Further in accordance with a preferred embodiment of the present invention, the method also includes providing an output indication of at least one identified root cause.

Still further in accordance with a preferred embodiment of the present invention, the method also includes adapting the topology-based reasoning step for use with a different type of network by adding at least one rule to an existing rule set employed in the course of the topology-based reasoning step.

Additionally in accordance with a preferred embodiment of the present invention, the TRS includes a rule set.

Further in accordance with a preferred embodiment of the present invention, the rule set includes a first rule associated with a first network element manufacture and a second rule associated with a second network element manufacture.

Still further in accordance with a preferred embodiment of the present invention, the TRS is operative to analyze at least one incoming alarm to determine a network element associated therewith.

Additionally in accordance with a preferred embodiment of the present invention, the TRS includes a table storing the manufacturer of each network element and wherein, upon encountering an incoming alarm associated with a network element, the TRS is operative to look up the manufacture associated with the alarm.

Still further in accordance with a preferred embodiment of the present invention, the network element includes a logical object.

Additionally in accordance with a preferred embodiment of the present invention, the network element includes a physical object.

Still further in accordance with a preferred embodiment of the present invention, the TRS is operative to identify a first root cause of at least one alarms and subsequently identify a second root cause based on at least one additional alarm which has arrived subsequently.

Further in accordance with a preferred embodiment of the present invention, the TRS is operative to represent, using a graph, the topology of an expected alarm flow pattern through a network being analyzed for faults.

Still further in accordance with a preferred embodiment of the present invention, the TRS is operative to traverse the graph in order to find the root cause and in order to find all the alarms that belong to a root cause.

Additionally in accordance with a preferred embodiment of the present invention, the TRS is operative to cluster incoming alarms into groups based at least partly on the alarms' time of arrival.

Still further in accordance with a preferred embodiment of the present invention, the TRS is operative to utilize knowledge regarding a bell-shaped distribution of alarms associated with each fault, in order to cluster alarms into groups each associated with a different fault.

Further in accordance with a preferred embodiment of the present invention, the TRS is operative to cluster incoming alarms into groups based at least partly on the topological distance between the alarms.

Still further in accordance with a preferred embodiment of the present invention, the TRS is operative to update network topology data on-line, without disruption to TRS operation.

Further in accordance with a preferred embodiment of the present invention, the system also includes a rule definition GUI operative to provide a user with a set of rule component options presented in natural language from which a rule can be composed.

Still further in accordance with a preferred embodiment of the present invention, at least one rules governing operation of the TRS can be changed without disrupting TRS operation.

Further in accordance with a preferred embodiment of air present invention, the TRS automatically adjusts to changing network topology.

Still further in accordance with a preferred embodiment of the present invention, the TRS is part of a network control system.

Further in accordance with a preferred embodiment of the present invention, the system also includes an event stream including a sequence of events, less than all of which are deemed alarms, and wherein the TRS can be connected to the event stream directly.

Still further in accordance with a preferred embodiment of the present invention, the TRS imitates the flow of alarms in the network, thereby allowing anyone with good knowledge of the alarm flow in a given network type to generate the rules for that network type.

Additionally in accordance with a preferred embodiment of the present invention, the TRS issues 'derived' alarms to describe root causes when no incoming alarm accurately does so.

Still further in accordance with a preferred embodiment of the present invention, the TRS results are sent to a fault management GUI without requiring the operator to look at a separate correlation screen.

Additionally in accordance with a preferred embodiment of the present invention, the TRS stores its decision results in a history database, thereby allowing users to review the decision results and associated alarm groups, after the faults that generated these decisions and alarm groups have already been resolved.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENT

Glossary

Figure 1:
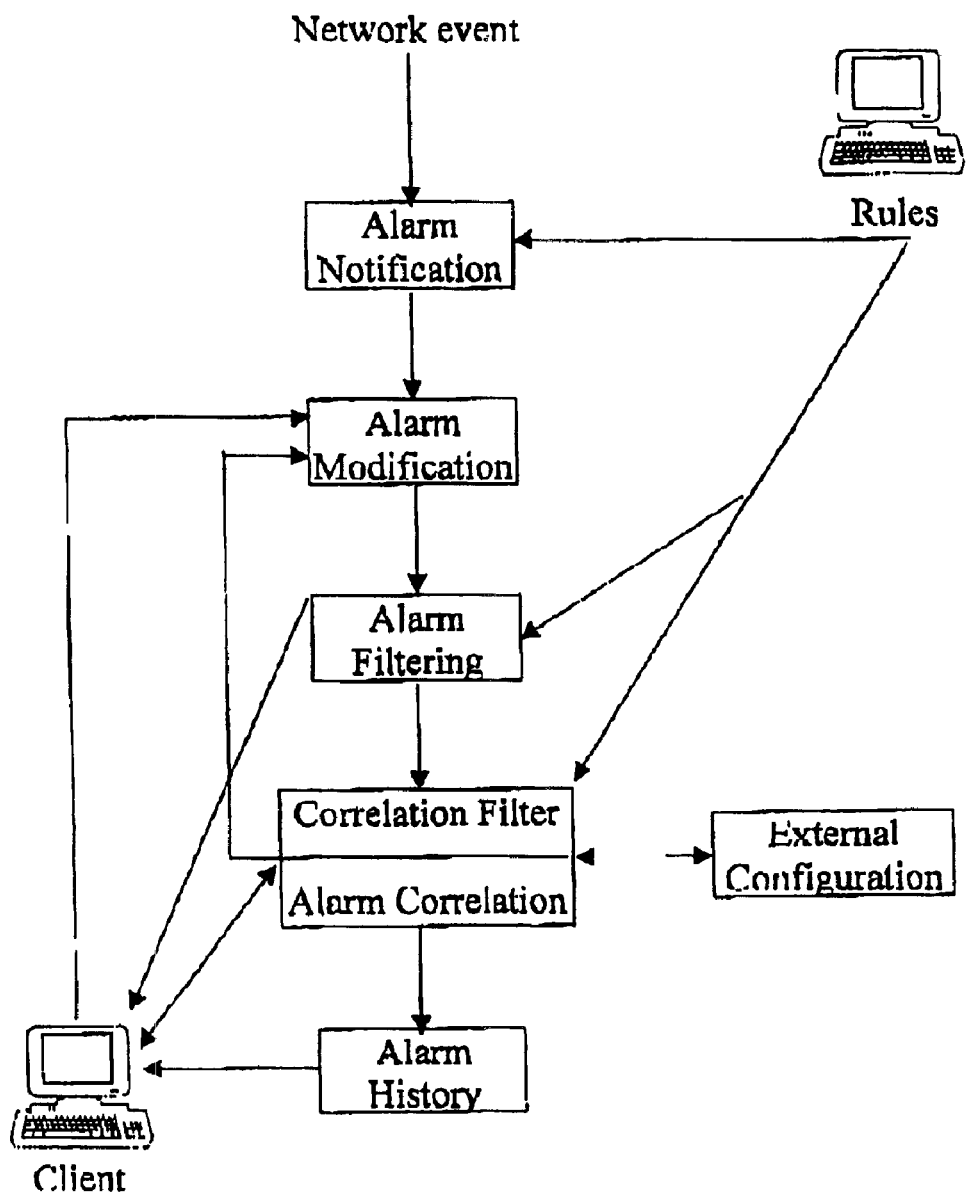
FIG. 1 is a simplified functional block diagram of a fault management system constructed and operative in accordance with a preferred embodiment of the present invention.

Correlation—Involves interpreting state changes, which occur in networks, network elements, and operational equipment or systems, in the light of related conditions and circumstances.

Repeated Alarm—An alarm that occurs periodically in the system. Previous occurrences are normally of cleared alarms.

Toggling Alarm—An alarm that changes states from up to down and and vice versa. After several changes like that it is defined as toggling.

Parent Alarm—An alarm that is identified as a cause of other alarm(s).

Child Alarm—Symptomatic alarm that does not describe root-cause. This alarm does not describe the root cause.

Independent alarms—Alarms that are not in the prototype of any root cause

Orphan—A child alarm that becomes an alarm without a parent, e.g. if the parent is cleared.

Fault—The physical or algorithmic cause of a malfunction. Faults manifest themselves as errors.

Alarm—A notification, of the form defined by this function, of a specific event. An alarm may or may not represent an error.

Root-cause—Cause of fault that is specific enough to directly imply the required repair action.

Derived alarm—Alarm created by management system based on received data that better describes root-cause than any alarm received from network (such as a cut wire).

Root-cause alarm—Alarm describing root-cause. Maybe be derived alarm or parent alarm.

Object—Any entity in the network that may be managed. It can be a NE, or a component within NE. Examples: cables, ADM's, cards, ports.

NE—Network Element

Rule—Description of the behavior of alarms when particular type of fault occurs.

User—Person with security clearance to use the functionality described.

Peak event—A burst of alarms that arrive to the system at a rate that resembles a Gaussian curve. Usually caused by a common fault.

Problem Group—A set of network elements or objects with a common set of faults.

Object Type—A type of a network entity. The entity may be physical (for example a port or card) as well as logical (for example a facility or circuit).

Object ID—a unique identifier of a network entity instance.

Preferred Architecture

A correlation product may cover many functions. These functions may be performed in different ways and in different phases of processing of a network event.

For example: simple alarm correlation needs to occur after the event is identified as an alarm and before it is presented to the user. Manual de-correlation occurs after the alarm is displayed and before it is cleared.

Some of these events address different user communities such as

Alarm experts which define the correlation rules
System administrators which manage the correlation system
Controllers which use the data provided by the correlation system for decision making and to interact with it via GUI All of the above bring in the conclusion that a correlation system needs to be constructed of several modules. These modules may be able to interact one with the other and to be able to act as required.

Following are the main modules:
Rules definition tool.
Extended expert system to act upon the rules.
External sources interface, e.g. to query a configuration data base and to interact with an alarm display window.

FIG. 1 represents a schematic interaction diagram. It does not represent how the modules may be implemented. It describes how alarms are processed centralized around alarm correlation.

The schema suggests that a correlation system can comprise of a real-time component and a near real-time component. The real-time one can perform simple correlation but also alarm filtering. The near real-time component can perform correlation rules that are defined against external information.

Modules described in FIG. 1:

Alarm notification—Identify alarm condition by some algorithmic applied to the condition.
Alarm modification—Apply changes to the alarm when the alarm status changes and when new occurrences of existing alarms come in.
Alarm filtering—Select a specific alarm that matches a set of conditions and apply a rule to it.
Correlation filter—Filter out non-relevant alarms from correlation aspects, e.g. filter out low-level alarms when a higher level one is still active.
Alarm correlation—Identify alarms that may be correlated without obtaining data from external sources. In parallel to that build groups of alarms to apply topological correlation. Perform the rough and fine reasoning algorithms.
Alarm history. Store history information of alarms.
External configuration—Give information about topology and states of a network and its component NEs, to facilitate advanced alarm correlation. It provides access to information concerning identified root causes.
Rules—The user work station to facilitate system and rule administration.
Client—The user work station to facilitate alarm viewing and correcting.

Preferred Flow

The correlation system is preferably based on an expert system and uses network topology information. In general when the system is flooded with alarms, different algorithms and rules are applied on those alarms. The purpose of all of those is to find the root cause of alarms. Following is a general description of the events and actions that occur until a root cause is found:

1. The first stage is during system setup. All the alarms may to be defined and associated to groups.
2. Through the expert system specific rules are defined. The preferred characteristics. for these rules are outlined below. The rules serve for 2 purposes:
   Filter out alarms that do not need to be correlated or part of the correlation process.
   Find the root cause alarm from a candidate group of alarms.
3. When an event occurs and identified as an alarm, that alarm is given an ID, which uniquely identifies the alarming object in the configuration database.
4. The correlation filter filters out non-relevant alarms. This process uses pre-defined rules.
5. The alarms are grouped according to time characteristics and clustered by using network topology considerations.
6. Each cluster is investigated by the correlation engine that deducts the probable root cause or root causes for that group.

Preferred Workflow of the Algorithm

The correlation decision algorithm is preferably implemented in four phase:

1. Construction of a topology graph based table of network entities and fault rules (this phase is done offline).
2. Collection of the income alarms and dividing them into groups by time.
3. Clustering of the alarms by network topology and by rules
4. Execution of the decision algorithm on a cluster of alarms
   The input of the algorithm includes:
   1. Network topology information.
   2. A list of network elements under maintenance (with the maintenance start and end times).
   3. A list of probable faults in the network and the probability of their occurrence.
   4. A list of fault propagation rules.
   The output of the decision algorithm includes:
   1. The correlation results, the root causes and their confidence, correlation identifiers etc.
   2. Table of the parent/child and derived status of each alarm that was processed by the correlation mechanism.
   New derived alarms for root causes that do not have a matched alarm.

Preferred Characteristics

Preferred Rules Definition

The correlation is preferably based on three types of rules:

1. Fault propagation rules—Rules that connect two types of elements in the network and their respective faults. The rules are of a generic level, thus they do not relate to a specific element rather to element types and network technology.
2. Optional specific cause and effect rules (related to the different alarm fields)
3. Supplementary rules used to define actions in the system, such as filtering out of alarms, creating trouble tickets, automatic defer of alarms etc.

The rule user interface has the following preferred characteristics:

1. Access permission to any rule definition action can be secured.
2. All the fields in an alarm that represent topology information can be used (object ID, object type, equipment name, equipment type, from site, to site, device name, module name, access name, priority, and topology). In addition to that the alarm type field is used.
3. A rule can be added, removed or modified
4. A rule's active period can be set between start and end dates.
5. A set of rules or a single rule can be enabled or disabled.
6. Rule syntax needs to be validated and rejected if not properly composed.

7. Data from one field to another can be copied and pasted.
8. Provide on-line and context sensitive help.

Preferred Expert System

The expert system acts upon the rules. It preferably processes the incoming alarms and decides according to the rules if the alarms are correlated. Following are these system preferred characteristics:

1. Can process single or groups of alarms.
2. Process rules according to their start and end dates.
3. Can count the number of related alarms.
4. Can compute percentage.
5. Can measure the time difference between alarms.
6. Compares alarm data to rule data.
7. Single alarm suppression, i.e. an alarm will not be raised if it is still up when another alarm like that comes in.
8. Accept now and changed rules without downtime.
9. Support a large number of rules.
10. Can archive rule sets to allow reversion to previous sets of rules.
11. Runs on UNIX and NT.

Preferred Correlation Engine and Interface

The correction engine preferably extends the expert system by using the expert system results to further investigate the alarms and find the root cause. It groups the alarms under a group leader. Then finds the candidate group that contains the root cause. The final step is to apply rules to find the root cause.

The engine needs to send indications to the client on the results and to be able to receive input from it. It also stores the results in the database. Following are this component preferred characteristics.

1. Can create derived alarms. A derived alarm has the same structure and format as a full alarm.
2. Can create parent/child/orphan indications.
3. Can create maintenance affecting indications.
4. Can de-correlate 'on the fly' upon alarm status changes or after manual de-Correlation.
5. Can update itself after all the possible manual interventions like add alarms to a parent alarm.
6. Full recovery: Can synchronize its alarm repository after an abnormal failure.
7. Periodically update the network configuration date due to network changes. The update may be done on-the-fly simultaneously to the systems' activation, without interrupting the normal workflow.
8. Take down a derived alarm if a derive alarm condition is not correct any more.
   The children of this alarm may be displayed.
9. Store all correlated alarm information in history for future reporting. Any other significant detail like rule description may be stored with it.
10. Send the following information to the user interface: alarm data, indications, rule reference, correlation group ID, number of alarms in the group, and time stamp of first and last alarms in group.
11. Update alarm data if a similar alarm to an existing one comes in.
12. Maintain date integrity, e.g. a parent alarm can't be a child of its child.
13. The system may send notifications to other systems, e.g. about alarm floods.

Preferred User Interaction Interface

The user interaction interface is preferably used by the controllers to view the results of the correlation system. It is also used to manually affect the results. Following are the preferred characteristics of this interface:

1. View children alarms of a derived alarm.
2. All actions on a regular alarm can be performed on a derived alarm, e.g. defer, acknowledge etc.
3. Manually add alarms to a derived/parent alarm.
4. Manually subtract alarms from a derived/parent alarm.
5. Manually clearing out a derived/parent alarm results in all children being orphaned.
6. Access permission to any action (including view) can be secured.
7. Manually undo derived alarms.
8. Manually undo parent/child correlation.
9. Be able to confirm recommended correlation.
10. Be able to display by criteria any combinations of alarms, which are parent, derived, and children.
11. Display the following alarm indications: parent, derived, child, orphan, toggling, repeated, orphan, recommended parent, recommended derived and recommended child.
12. Display the correlation history with all the relevant information.
13. When opening a trouble ticket for a parent alarm all the children information can also be referenced in the trouble ticket system.
14. Provide on-line and context sensitive help.

Preferred External Configuration Interface

The correlation system needs to query preferred external sources in order to do advanced correlation. This means mainly to get configuration ad topology information but also for example to determine if the alarms are service affecting or not. The nature of this process is real-time and near real-time.

This process has a human like intelligence that can discover knowledge from external sources to determine root cause alarm. The expert system will run appropriate rules that get this information. In order for the results to be accurate as possible the information about reconfiguration and network testing needs to be updated dynamically.

Following are the preferred characteristics of this interface:

Correlation Filter

1. Supply maintenance status (out of service, in test . . . )—this can be used to build correlation rules ahead of time.
2. Supply NE status information.

Grouping Algorithm Stage

3. Ability to group alarms according to the time stamp.
4. Cluster alarms of a specific group according to network configuration and network distance between each two related elements in the group.

The Preferred Idea Behind Correlation

The system may able to find the problem that created a set of alarms. It preferably uses the network topology and alarm rules to do that. The 2 sets of information preferably are united in such a way that a topology graph preferably is created and the alarm rules preferably are added to it. By implementing the solution like that it becomes independent of vendor and of telephony technology and it provides a cross-domain solution.

Previous experience showed that topology information is important but it can't solely provide the information to automatically find a problem. The missing part is the relation between the problem and the alarm, i.e. cause and effect relationship between network element behavior and fault. Consequence scenarios may to be defined and then to be spread out over the topology graph. The system preferably walks on the graph according to the consequence scenarios. The scenarios are not necessarily defined per network element instance but in a more general level, e.g. NH type. Applying the scenarios requires making them specific per instance. Some of the scenarios don't necessarily define the exact problem because they aren't well determined. Regardless of that the system preferably is able to find the most likely fault. In this way the rules can be generic and the system can scale well to evolving networks.

Correlator+ TRS integrates with Correlation+ ES (which is a classic expert system based correlation product). Correlator+ was actually conceived from the beginning, to be built from two modules, one using a topology-based reasoning approach, and the other using a classic expert system approach, to ensure the widest fault coverage possible. (Some network faults are best handled by the first approach and others only by the second approach). Consequently TTI developed TRS which fulfills the topology-based reasoning role and a second module, ES which fulfills the classic expert system rule. The former (TRS), as indicated above, uses a topology-based reasoning approach. The later (ES) is built on classic expert system technology. When both are installed together, they interwork as one integrated system.

The Correlator+ TRS implements a generic algorithm that is independent of the specific implementation of the customer's network type and its configuration.

Preferred Objectives & Scope

The Correlator+ product preferably offer automatic alarm correlation information by use of fault rules and configuration data. The product preferably interfaces with the Fault management product, and preferably is integrated as part of the workflow of alarms in the system. The Correlator+ preferably is offered with the fault management product, and not as a standalone implementation. It also requires a full network DB inventory.

The main objective of the Correlator+ is help controllers more quickly find and trouble ticket the root cause of faults. It preferably does this by:

Achieving an unprecedented level of alarm reduction via suppression of false alarms due to maintenance and configuration activities.

Isolating and identifying the root cause of faults and alarms

Producing derived alarms when no real alarm accurately identifies the root-cause alarm It may be clearly stated that the main objective of the Correlator+ is to diagnose root causes for "floods" (large number of alarms due to a common problem). Specific cases to identify parent-child correlation preferably are done via an expert system Preferred Architecture/Process Flow
Preferred Correlation Algorithm The correlation algorithm preferably behaves as follows:
1. Tables that represent relations between network elements and faults and between root cause problems and alarms, preferably are constructed by offline procedures, and preferably are used by the decision algorithm. The source data for construction of the tables preferably are:
   Configuration data
   Probability data
   Propagation rules of defined by the customer.
2. Each new alarm is classified into time groups and clusters.
   3. The decision algorithm preferably activate on a group after a group has been diagnosed as ready for the algorithm. A group preferably is diagnosed as such, according to time and load parameters.

Preferred Module Architecture

The correlation application preferably is constructed of the following modules:
1. Client—Preferably an interface for the user in view the correlation results as well as perform various fault management functions.
2. server processes—The processes preferably update the database on incoming alarms, and alarms modifications and inform the correlation mechanism of this information. Correlation data from the correlation mechanism preferably is accepted, and the database preferably is updated accordingly. The information preferably is distributed to the clients.
3. N Netcorre handler—This process preferably directly interface with the Correlation Mechanism. It preferably receives alarm information from the N_distribute handler process, and constructs messages in the CorrelateService (see below) language. It preferably subscribes on correlation results; construct alarm data structures according to that data, and distribute it to the N_alarm_handler process.
4. CorrelateService—The service preferably include the following main building blocks:
A. Correlation Engine—This part of the CorrelateService preferably deal with the following actions:
   Update Alarm Data—Receive new alarms, alarm updates and drops of alarms from the server processes and processes them.
   Periodic Process—"Awaken" at fixed time intervals and calls the corresponding grouping periodic method.
   Analyze Results—A method called by the Decision algorithm. It analyzes group data that has completed the decision algorithm. New derived alarms are created using the Generate Derived Alarm method, and the alarms with the correlation data are sent to the other processes.
   Generate Derived Alarm—A method that generates alarm data fields out of the object type and object ID, according to rules and configuration data.
   Recovery—This method preferably is called when the service is raised. It reads the correlation accessory data tables, and executes the grouping recovery method.
B. Grouping—The grouping main building blocks are:
   Assign alarm to group/update—Methods for processing a new alarm, updating alarm data or deleting a dropped alarm. The alarms are assigned into dynamic groups
   Periodic process—A method that periodically performs two actions: (1) decide to compute the decision algorithm on groups and; (2) Cleanup groups—delete obsolete dynamic groups
   Recovery—Read the alarm repository after the CorrelateService has been initialized (for example, after a "crash").
C. Decision Algorithm—ComputeGroupCorrelation—This module preferably performs the actual Design Correlation decision algorithm.
D. Computation of accessory tables—This module preferably computes and generates accessory tables of the decision algorithm in an offline manner. The source data preferably include configuration data base and fault rules defined by the user. The module preferably periodically (once a day) and upon request, updates the tables with updated fault and configuration data.
6. Memory⇔backup—All of the CorrelateService modules preferably access main data structures in the memory, with generically defined methods (data structures preferably therefore not be passed between functions). The data preferably is constantly mirrored to backup files, using self-defined methods.

Figure 2:
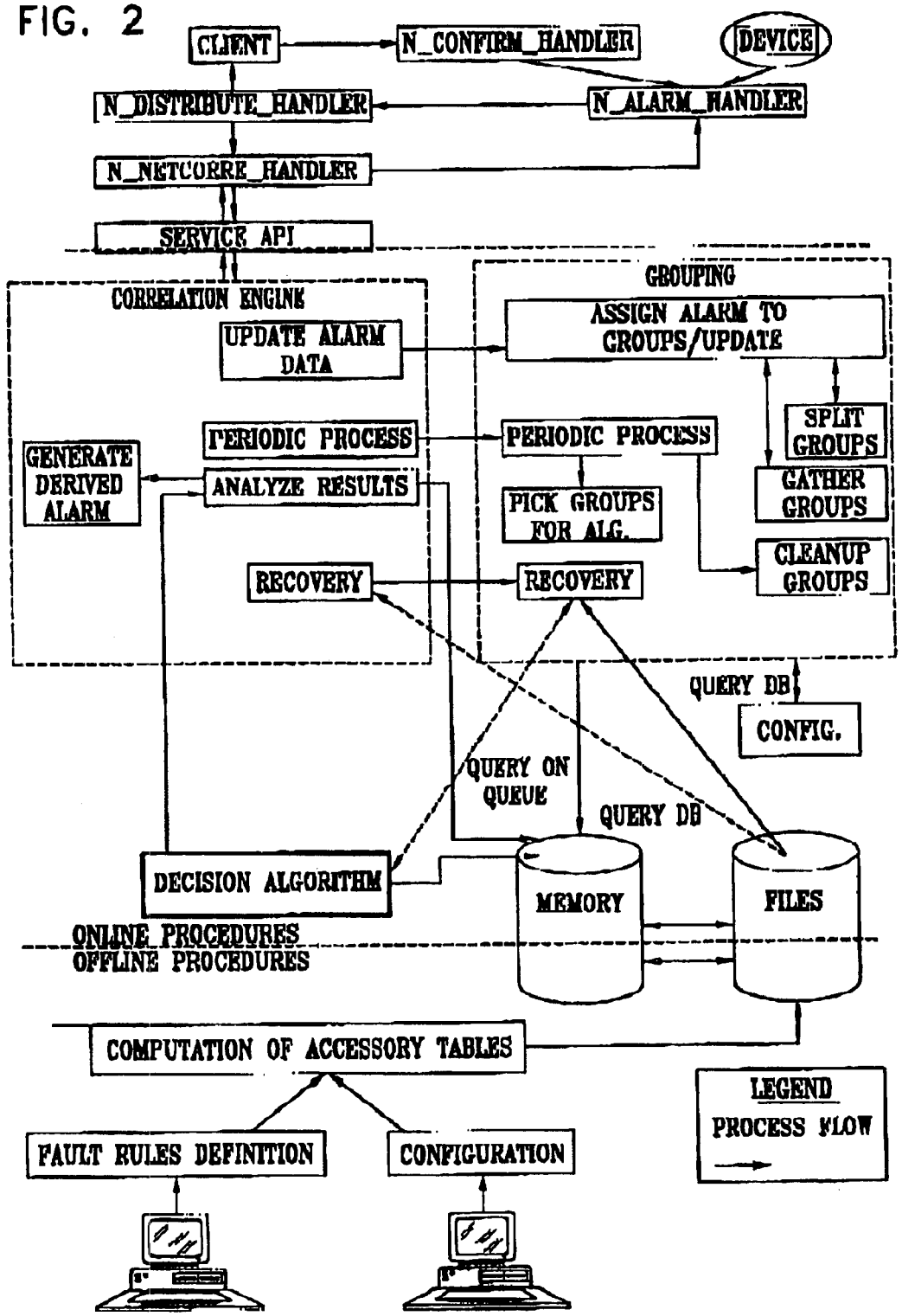
FIG 2 is a process architecture diagram of elements of a fault management system constructed and operative in accordance with a preferred embodiment of the present invention.

Preferred Process architecture is described in FIG. 2.
Preferred Correlation Mechanism The CorrelateService preferably gets alarm information (new alarms, updates of alarms and drop of alarms) from the N_netcorre_handler, and processes them.

Preferred Service Flow
1) The Service receives a new alarm, update of alarm data or drop of an alarm.
2) The grouping functions are called to assign the alarm to dynamic groups. The alarms in each group are then clustered according to the network topology.

3) Periodically, the grouping functions check whether any of the groups is ready for the decision algorithm.
4) The decision algorithm computes the correlation on a group. Before terminating, it activates an action in the CorrelateService. The decision algorithm preferably works on several separate threads according to a pre-setup of the system.
5) The CorrelateService calls a method for the creation of a derived alarm (if needed), and sends the parent/child data of the group to the N_netcorre handler, that is "subscribed" to the data.

Periodically, the grouping mechanism is called to delete obsolete group information.

Preferred Data Management

The system preferably holds two types of memory data:

Utility tables—These tables preferably are constricted by an offline procedure, and hold information regarding the relations between Network elements, faults and alarms, as described in the next section in detail.

Dynamic grouping information—The dynamic grouping information includes:

List of alarms currently processed by the mechanism
List of alarm groups
Relations between groups
Output of the correlation algorithm The data preferably is also mirrored to file, for the following scenarios:

Switching of utility tables with new ones, after the configurational database or the fault rules were altered.

Recovery after the CorrelateService was re-run.

Data needed for the preferred correlation algorithm and its representation:

External Data:
1. The relative probability of failures of the network entities, or (the complement of) their relative reliability;
2. The measure of the extent to which faults in network elements induce malfunction in other related network elements, or, more specifically, the possibility that a given fault in some network element would be followed by some definite fault in some adjacent network element. These data essentially constitute a formal expression of the technical-operational causality within the network;
3. The probability of receiving a signal about the malfunction of a network element when it is faulty;

All the listed probabilities are part of an advanced description of a network. The network description that is required may therefore be advanced and contain both configuration and functional-operational information about the reliability of the system elements as well as about the maintenance dependencies between adjacent elements of the network and the reliability of alarm emergence.

Following is a list of tables that preferably are constructed by offline procedures, and preferably summarize the needed information.

Preferred Correlation Object Types

The Following Object Types, for example, are maintained by the configuration database and preferably is used for description of Fault Propagation Process in Alarm Correlation:
1. Port-regular port, tributary port and aggregate port
2. Card
3. Device
4. NE
5. Shelf
6. Aisle
7. Bay
8. Location
9. Site
10. Fiber
11. Cable Segment Preferred Faults Definition Faults defined by the user (or supplied with the initial installation) preferably include the following information:

| Data | Description |
| --- | --- |
| Object type | |
| Class | Identifier of a Problem class (object type, eqp. group) |
| Probable Cause ID | |
| Root cause probability | |
| Alarm probability | |

Preferred Relations between Correlation Object Types

The following are examples for relations between the Correlation Object Types supported and maintained by the configuration database and preferably are used for description of Fault Propagation Process in Alarm Correlation and Root-Cause Analysis:
1. Contained in
2. Connected to
3. Internally connected to Preferred Topology Table A topology table preferably is created by offline procedures. The table preferably includes the following columns

| Field | Description |
| --- | --- |
| Object Type 1 | Identification of object type with primary fault |
| Object Id 1 | Identification of object with primary fault |
| Relation | Type of connection between Object Type 1 and Object Type 2 |
| Object Type 2 | Identification of object type with secondary fault |
| Object Id 2 | Identification of object with secondary fault |

The table preferably includes entity relations in the network, physical as well as logical. The table preferably include only the relations between entities that may be related in terms of faults. Meaning, two entities that do not affect one another's faults preferably are not listed, even if they have a physical relation. This table preferably is stored in the database, and updated periodically.

Preferred Fault Induction:

The rules defined by the user (or supplied with the initial installation) preferably include the following fields:

| Field | Description |
| --- | --- |
| Object Type 1 | Object Type with primary fault |
| Class 1 | Class of primary fault |
| Probable Cause 1 | Identifier of primary fault |
| Relation | Relation between Object Type 1 and Object Type 2 |
| Object Type 2 | Object Type with secondary fault |
| Class 2 | Class of secondary fault |
| Probable Cause 2 | Identifier of secondary fault |
| Probability | Probability of the induction |
| Rule management information | Rule set ID, user and date information |

Preferred Grouping Mechanism:

General:

The dynamic grouping mechanism is preferably introduced to improve the performance of the system. The motive is to preform the decision algorithm only on a limited set of alarms that are suspected to be correlated, and not on all of the alarms.

The dynamic grouping mechanism works according to the following steps:
1. Incoming alarms are grouped according to the time they arrived, according to time slices defined by a parameter. The raise time of the first alarm after the previous group was closed is defined as the starting time of the present group. Any alarm that arrive in an interval (defined by the parameter) preferably is joining to this group.
2. The application constantly monitors the number of alarms arriving per time interval (as defined by a second parameter). If this number raises above threshold (also defined as a parameter) the correlation deducts that a "peak event" is in progress and continue to collect the alarms, even if the group interval time has passed, until the "peak event" terminates.

A group of alarms that have arrived during the same time interval, are clustered into groups according to the correlation rules and network topology. A group contains alarms that have any connection between them according to the graph. The clustering function searches for connections on the graph between the alarms in the group. Two alarms are defined as "connected" if they have a mutual root cause. All the alarms from the group that have the same root cause preferably is grouped to the same cluster.

A cluster of alarms is sent to the decision algorithm phase, for diagnosis of the root causes.

Figure 3:
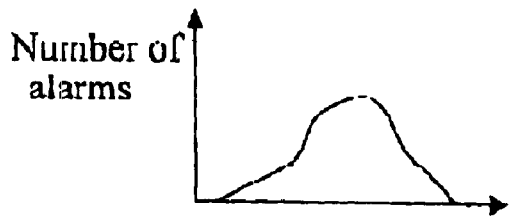
FIG. 3 is a graph illustration of the expected distribution of the number of alarms over time, for a particular fault.

Preferred Time Grouping:

Alarms are preferably time-grouped according to the following algorithm:
1. Alarms that have arrived during a defined period of time ("time tolerance") from the starting time of the group are gathered together. After the group is closed the clustering mechanism is triggered. If "peak event" is detected (refer to the above section), the group interval is extended, in order to put all the related alarms in the same group.
2. Every fixed duration of time between the start time of the group and "max time for group gathering" (the time period that was allocate for collecting the peak alarms), a check is made for alarms that have arrived late, but that their up-time belongs to the time tolerance period. If new alarms where found, the clustering is re-computed on the group. In such a case, the root causes that were diagnosed are re-evaluated.
3. A "peak" event is diagnosed as a "burst" of alarms, as illustrated in FIG. 3. If a "peak event" is diagnosed (according to the load of alarms), the following algorithm is invoked:

The peak start time preferably is considered as the start time of the dynamic alarms group that is currently being collected.

During the event, after fixed "time tolerance" durations, all of the alarms that have arrived during the peak event are re-clustered, until the peak event ends, or "max time for group gathering" is reached. Note that in this case, the decision that the user sees may change several times, until the peak event ends.

Preferred Clustering:

The clustering mechanism groups the alarms from a dynamic group into clusters of alarms. Alarms preferably are clustered together, only if there are fault propagation rules that can relate the two alarms to a common root cause, at a reasonable "distance" from the alarms. The clustering is done by searching a root cause for each alarm that exists in the group. For each root cause that was found as a probable cause for the alarm, this alarm preferably is noted as one of its expected alarms. After the searching is done for all the alarms from the group, the clustering is invoked, based on the list of expected alarms for each root cause.

Figure 4:
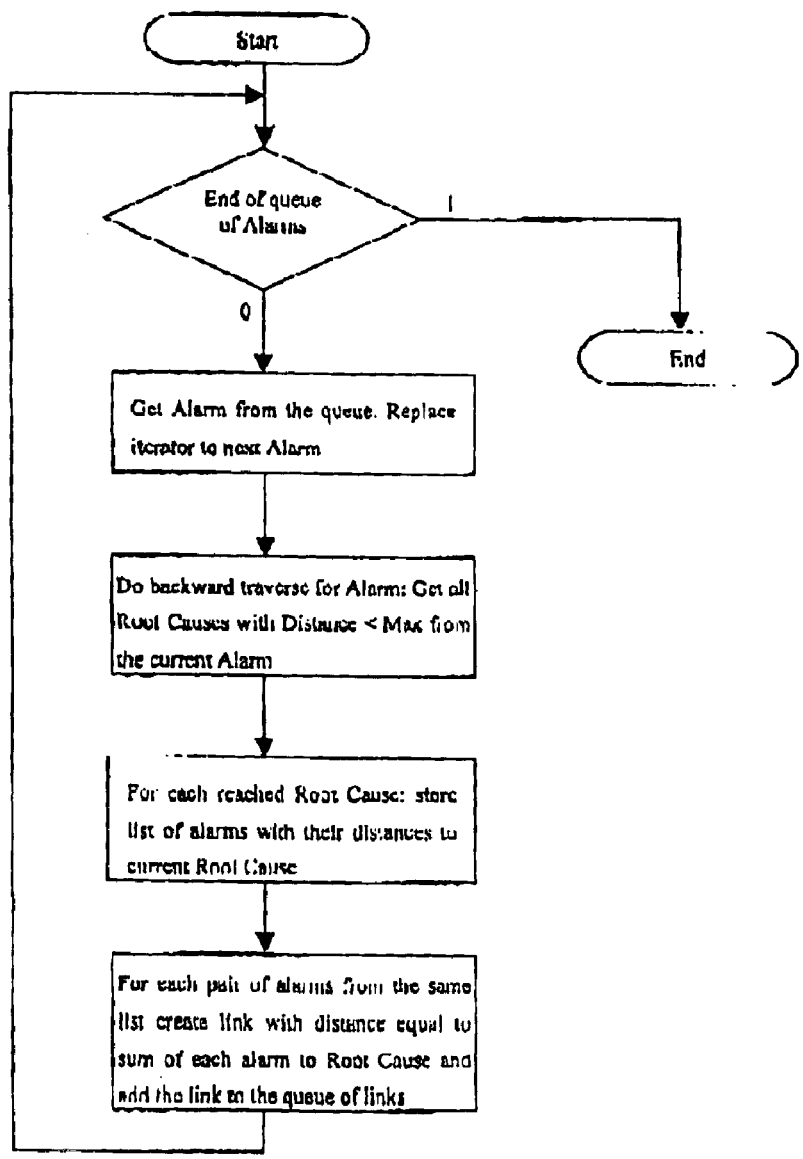
FIG. 4 is a simplified flowchart illustration of a preferred method for grouping alarms including finding links between alarms.
Figure 5:
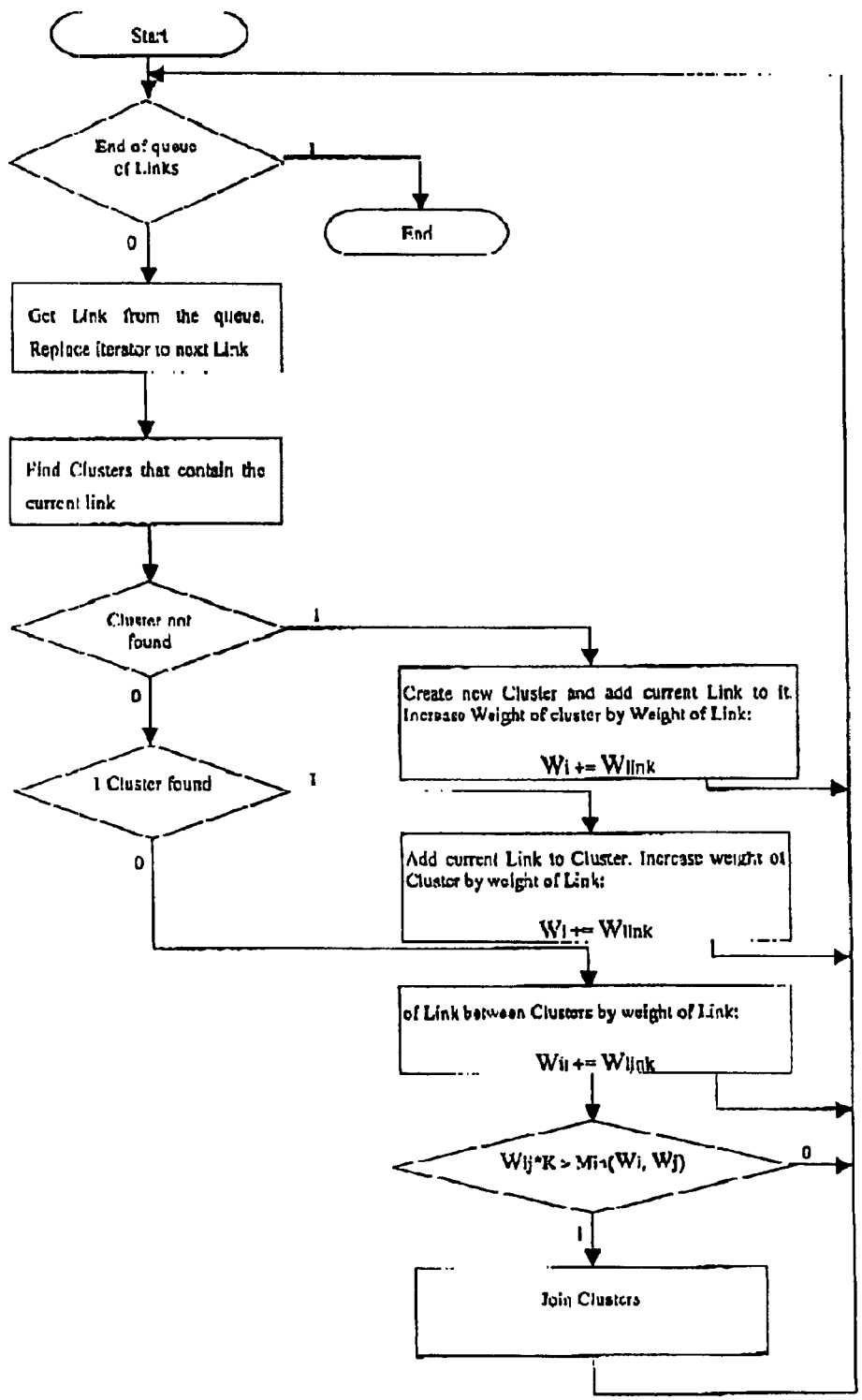
FIG. 5 is a simplified flowchart illustration of a preferred clustering method.

Reference is now made to FIGS. 4 and 5.

Preferred Group Clean-Up:

Dynamic groups preferably reside in the system after the computation of the algorithm, until the maximal time limit. The groups may be used for displaying the correlation results in several stages (initial result, final result).

Preferred Decision Algorithm

Preferred Concept:

The Decision algorithm reviews the topology and rules graph, in order to find the root cause that can explain the set of alarms.

Figure 6:
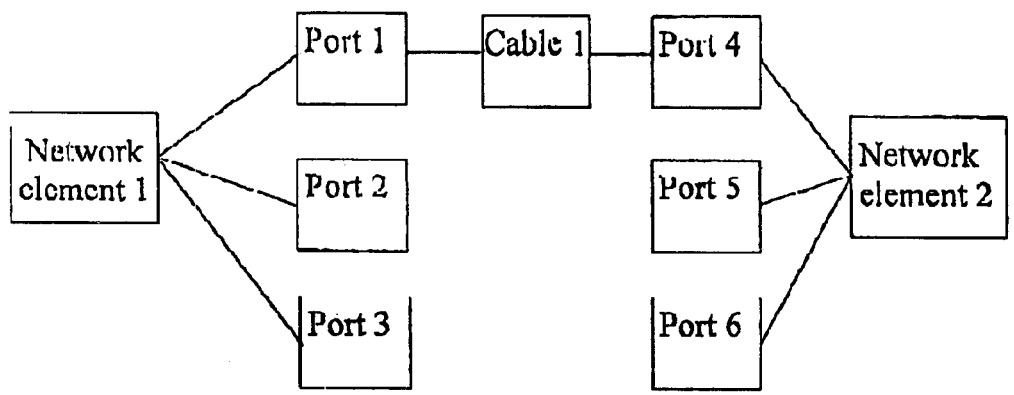
FIG. 6 is a simplified example of a topology graph.

Consider the following logic diagram of the network. Each node in the graph represents an entity in the network, as shown in FIG. 6.

The alarms that have arrived are marked on the corresponding vertices, with an indication of the specific fault that has been noted.

Figure 7:
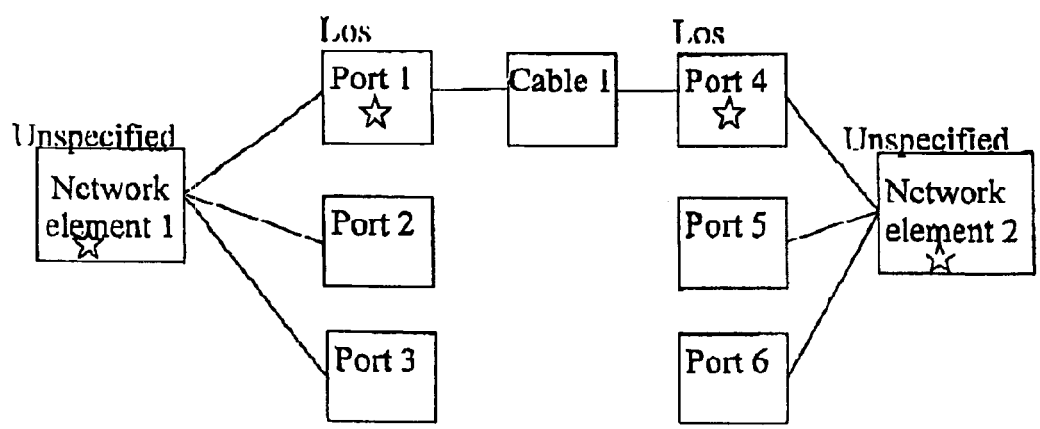
FIG. 7 is a diagram showing a first pattern of incoming alarms represented in the graph of FIG. 6.

In the example of FIG. 7 alarms have arrived from the two network elements and from ports 1 and 4.

Figure 8:
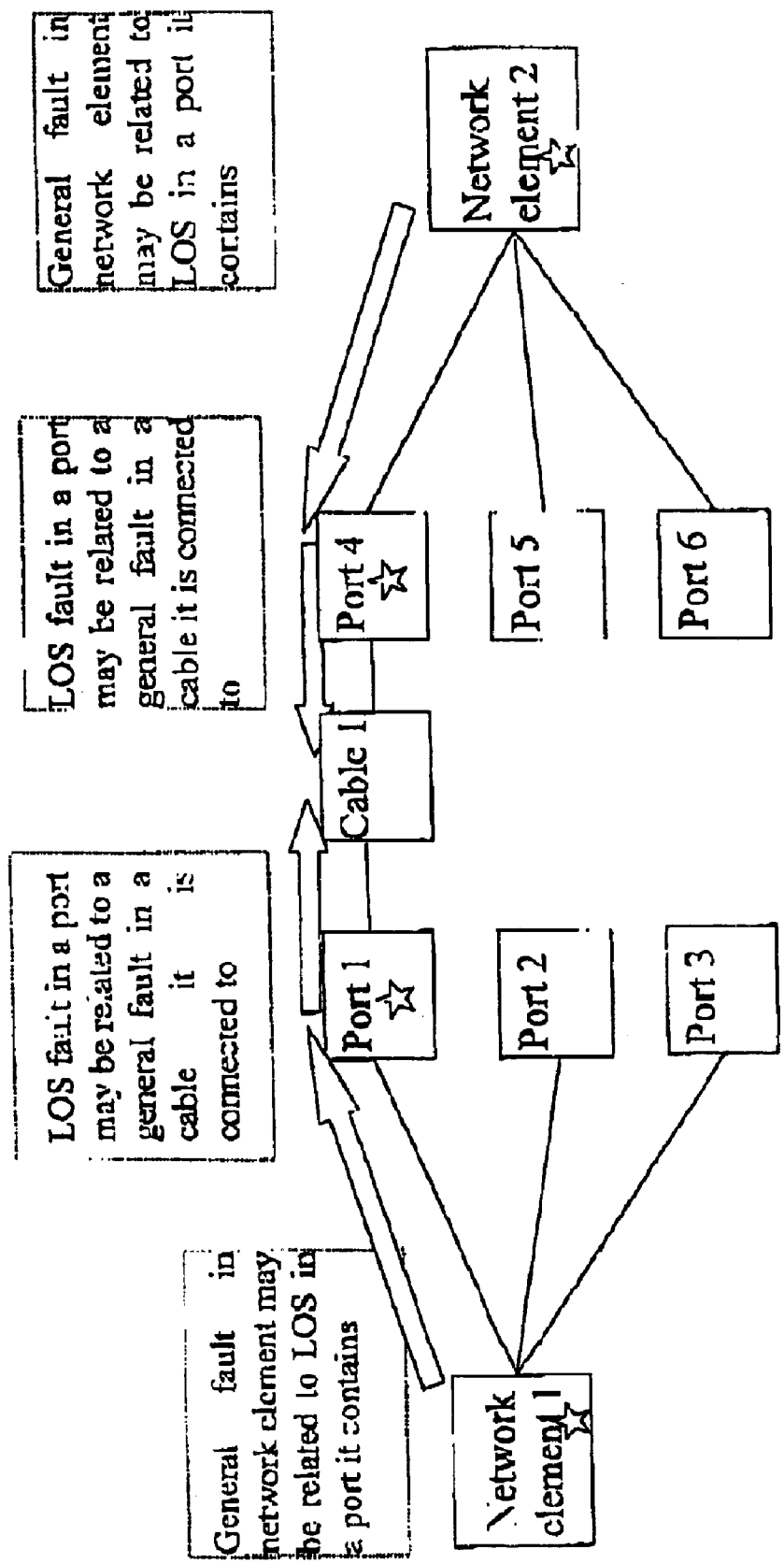
FIG. 8 is a diagram showing the system performing a backward traverse of the graph.

According to the fault propagation rules, the algorithm deducts the fault propagation step by step. In the example of FIG. 7, the algorithm deducts that a problem may have occurred in cable 1, since a fault in the cable may generate alarms in both ports, and those alarms in the ports may generate alarms in the network elements. This is shown in FIG. 8.

The algorithm comprises of two main phases: the "forward traverse" and the "backward traverse". The backward traverse is a traverse from the alarm to the root cause and the forward traverse is a traverse from the root cause to the alarms.

For each alarm in the cluster the correlation uses the backward traverse in order to find all its probable root causes. For each probable cause that the correlation finds it notes this alarm as one of the real alarms of that root cause. By performing the backward traverse the algorithm collects all the real alarms that were generated by this probable cause.

At the end of the "backward traverse" phase, there is a list of probable causes that explain each and every one of the incoming alarms. The "forward traverse" is then invoked on each of the probable root causes in order to find the theoretical number of expected alarms for each of the probable root causes.

The algorithm focuses on the proposed probable cause according to the following factors:
1. The probability of the event occurring
2. The ratio between the number of alarms that were related to the root cause and the number of expected alarms.
3. The ratio between the number of alarms that were related to the root cause and the number of alarms in the cluster on which the root cause was found.
4. The distance between the root cause and all the alarms that where found as child alarms.

Figure 9:
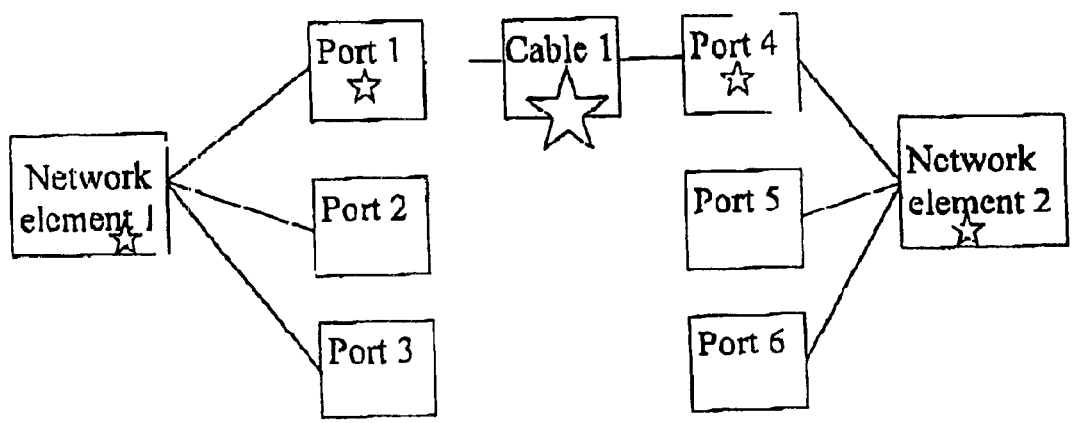
FIG. 9 is a diagram showing the detection of the root cause of the alarms illustrated in FIGS. 7 and 8.

Using the above factors, the algorithm generates the confidence for the occurrence of each of the possible root causes. The root causes with the highest confidence preferably is reported to the application users. In the above example, the application may deduct that the root cause that generated the alarms, is in cable 1, as shown in FIG. 9.

Preferred "Forward Traverse" & "Backward Traverse"

The backward and the forward traverses are preferably done using the following principle:

Given a Node ("node 1") on the graph that represents an object on the network, and a probable cause on that object the algorithm finds all the elements finds all the elements ("node 2") that are (1) connected to this Node by one of the relations described above and—(2) there is a rule that relates to the probable cause on the first node. These elements are inserted into a queue along with the probable cause that is deducted by the rule, and in time preferably is used as the first node and probable cause pair.

In the "backward traverse" the "node 2" is a suspect probable cause for the original alarm. In the "forward traverse" it is a theoretical expected alarm for the original root cause.

The traverse sequence is finished when there is nowhere to go from the end nodes, or the traverse has reached a limit distance between the original alarm and the probable root cause (in the "backward traverse") or the original root cause and the alarm (in the forward traverse).

Preferred Output

The correlation algorithm preferably diagnoses several cases, of a mix of them:

Independent alarms. Alarms that are not in the prototype of any root cause.
1. One or more root cause alarms—that any of them can be the correct root cause (independent root causes).
2. A pair of root causes with high confidence—If the application does not find a single root cause with a high-enough priority it looks for pairs of root causes that occurred simultaneously.

Figure 10:
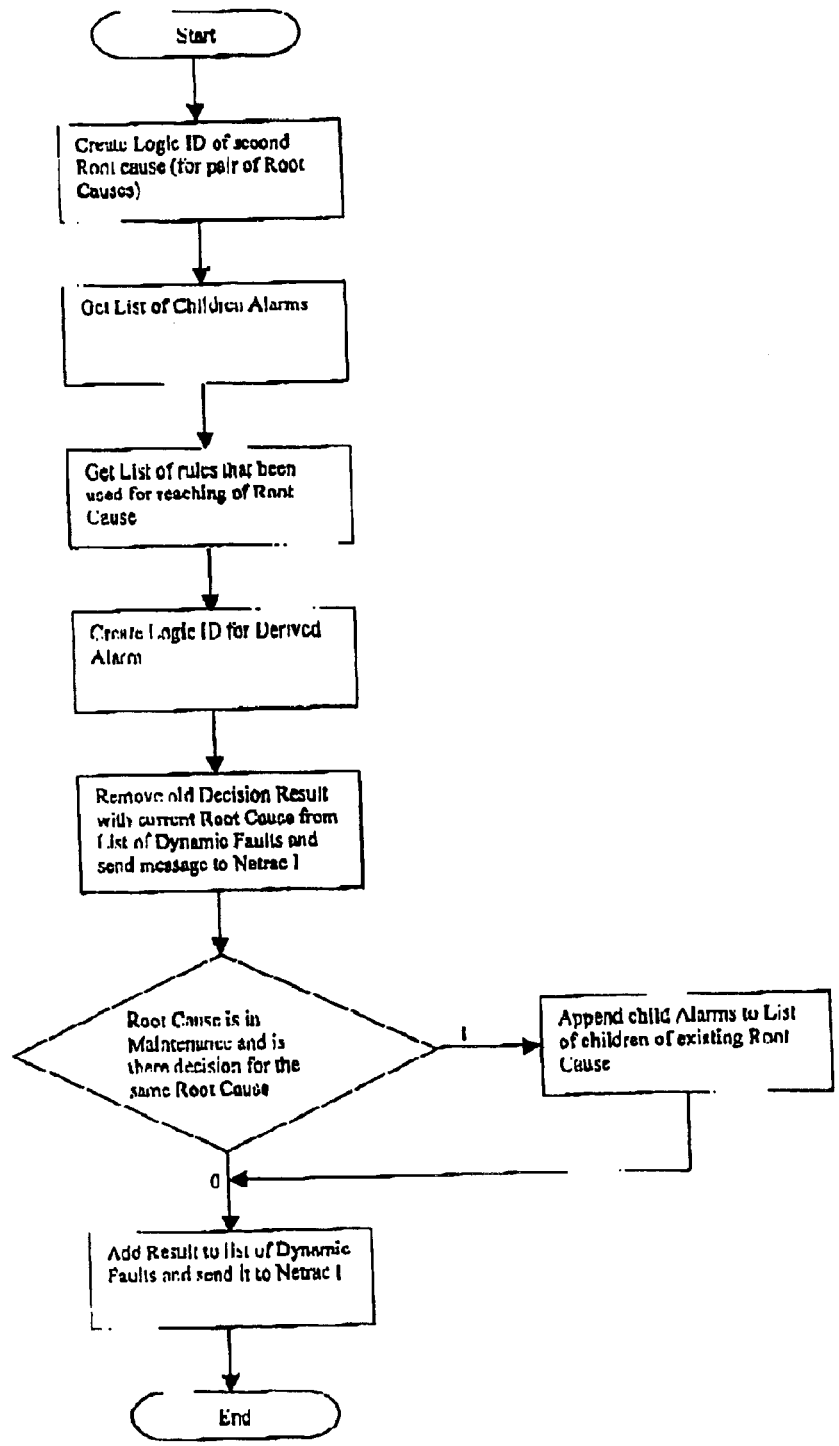
FIG. 10 is a simplified flowchart illustration of a preferred method for generating output results for a root cause.

Reference is now made to FIG. 10.

Preferred Correlating an Alarm to a Known Root Cause:

If the dynamic grouping diagnoses an alarm as belonging to a dynamic group that has already been processed by the decision algorithm (this is the case of a delayed alarm that has arrived late although its date time up is correct), the group preferably is re-sent to the decision algorithm.

When the decision algorithm gets a new dynamic group it preferably check, in a faults table, if the group has been processed, and if so, what are the related faults.

If faults are found, it preferably update the faults' confidence with the information on the new alarms.

If the confidence of the faults drops bellow the allowed threshold, the decision algorithm preferably is re-invoked on the group.

Preferred Display of Correlation Results:

The correlation results may be preferably displayed in two forms: informative description and recommendation. The decision whether or not to display the results as a recommendation preferably is based on the confidence of the root cause.

Preferred Definition of a Derived Alarm:

A derived alarm is preferably a fictive alarm, raised by the system to report a fault in a network element that is incapable of reporting alarms by it self (such as a cut cable). The correlation decision mechanism may suggest a fault in a network entity, which is defined by object type and object ID identifiers. The mechanism may also output the alarm type and probable cause of the fault.

The CorrelateService preferably create an alarm, with the following field values;
logic ID—"D-G"<group instance number>"-T"<object type>"-ID"<object ID>
object type—the object type of the root cause entity
object ID—the object ID of the root cause entity
description—"Derived Alarm:"+<description of the root cause entity>+<the description of the probable cause>
probable cause—The probable cause number of the root cause
date time up—The earliest date—time up of all the children of the derived alarm
priority—The highest priority of all the children of the derived alarm
alarm class permission—The "union" of the alarm class permission of the children. Meaning, the users that have permissions on any of the child alarms preferably have the same permissions on the derived alarm.

Figure 11:
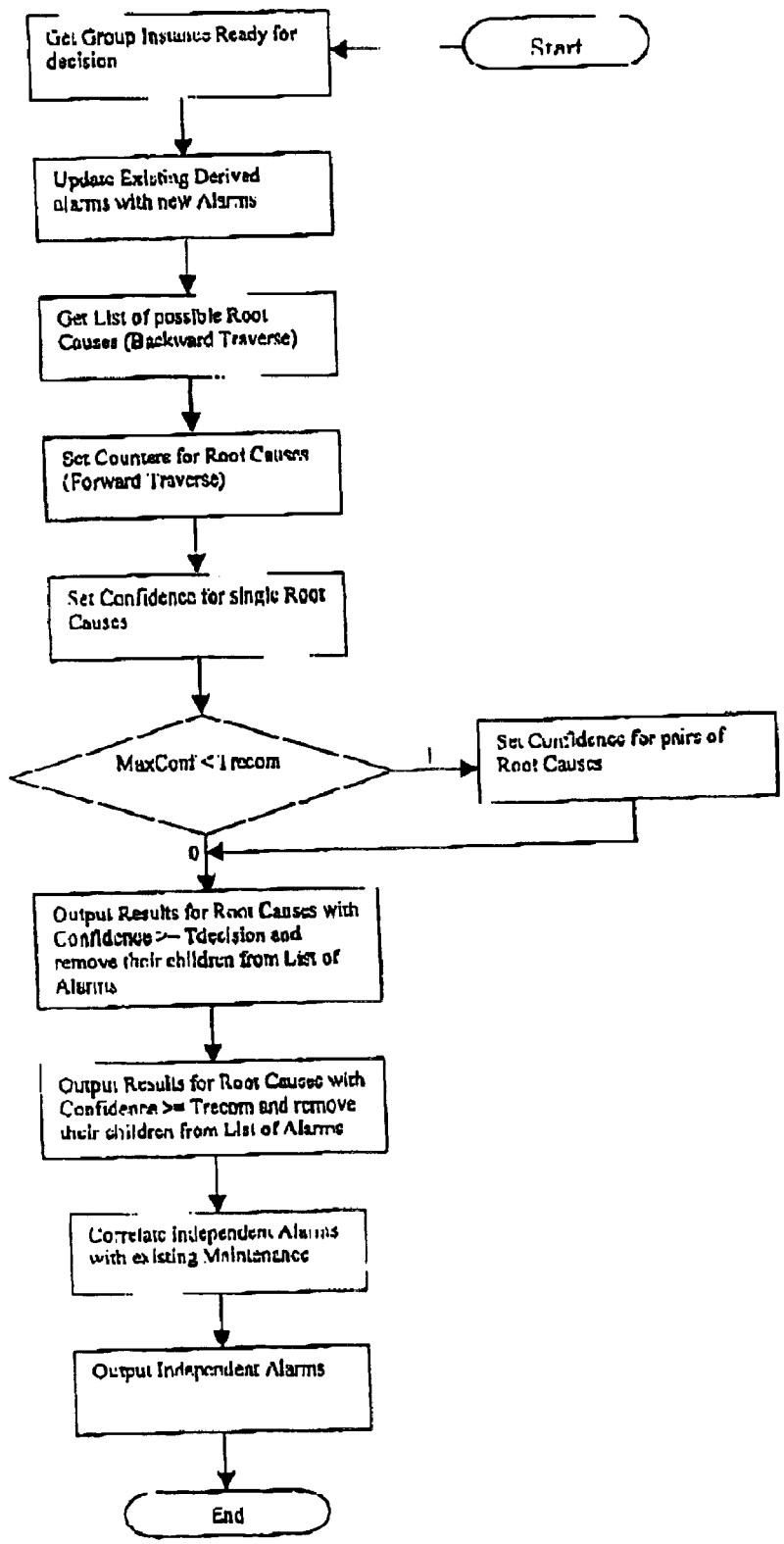
FIG. 11 is a simplified flowchart illustration of a preferred method for performing correlation for a group of alarms.

Preferred Detailed Decision Algorithm:

Correlation algorithm for group of alarms—preferably as shown in FIG. 11

Figure 12:
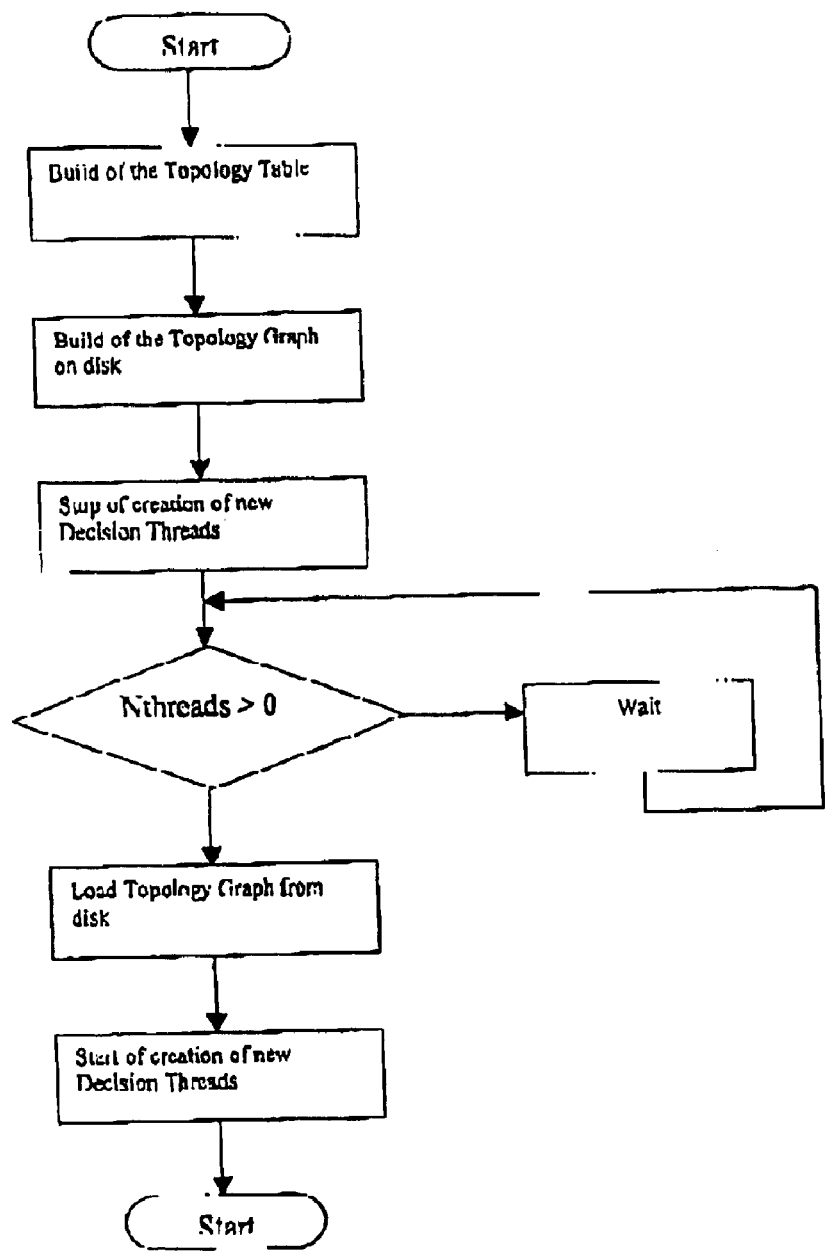
FIG. 12 is a simplified flowchart illustration of a preferred method for manipulating a topology graph load offline.

Algorithm for manipulation of the Topology Graph—load offline preferably as shown in FIG. 12.

Figure 13:
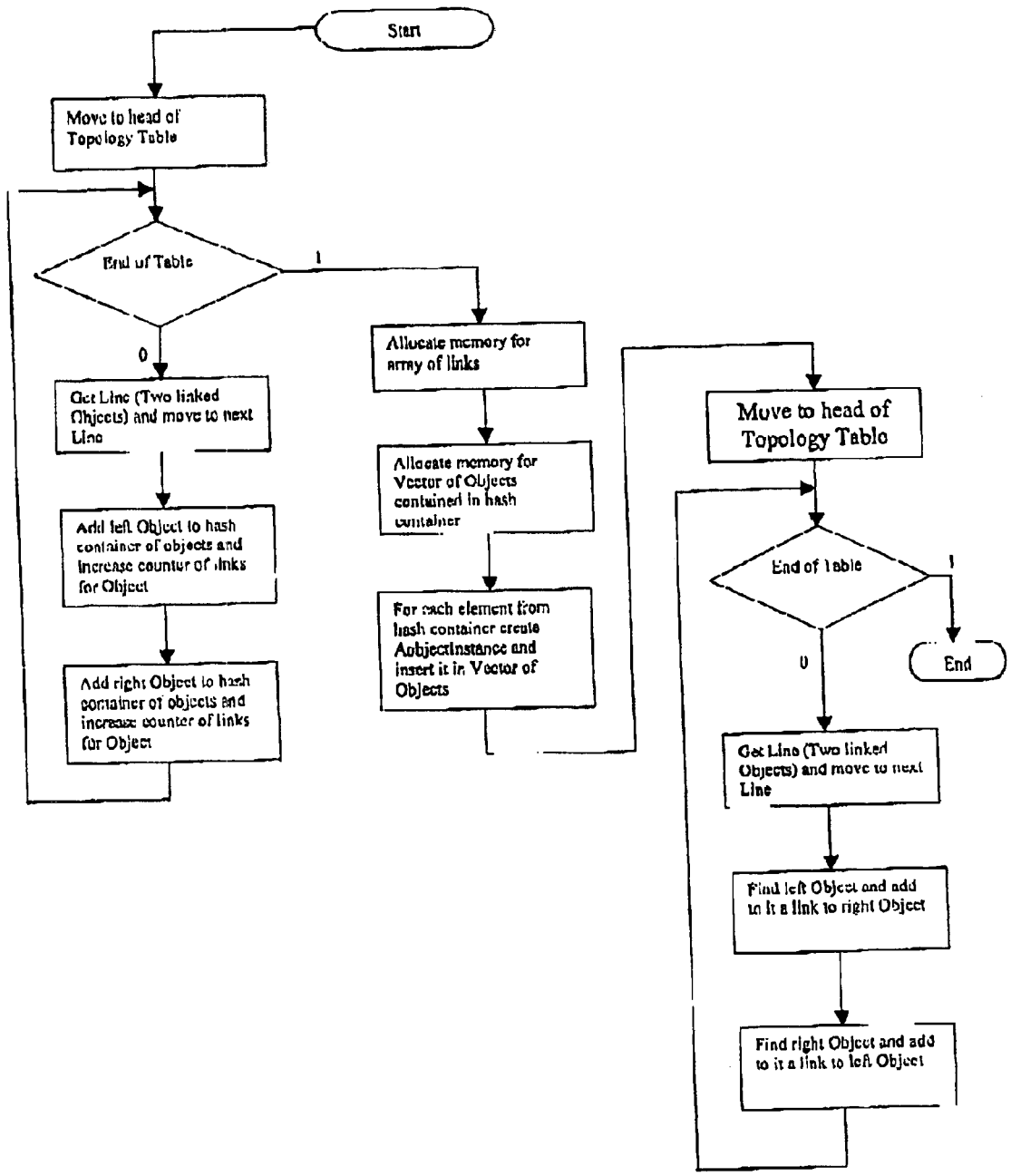
FIG. 13 is a simplified flowchart illustration of a preferred method for building a topology graph.

Algorithm for building the topology graph—preferably as shown in FIG. 13.

Figure 14:
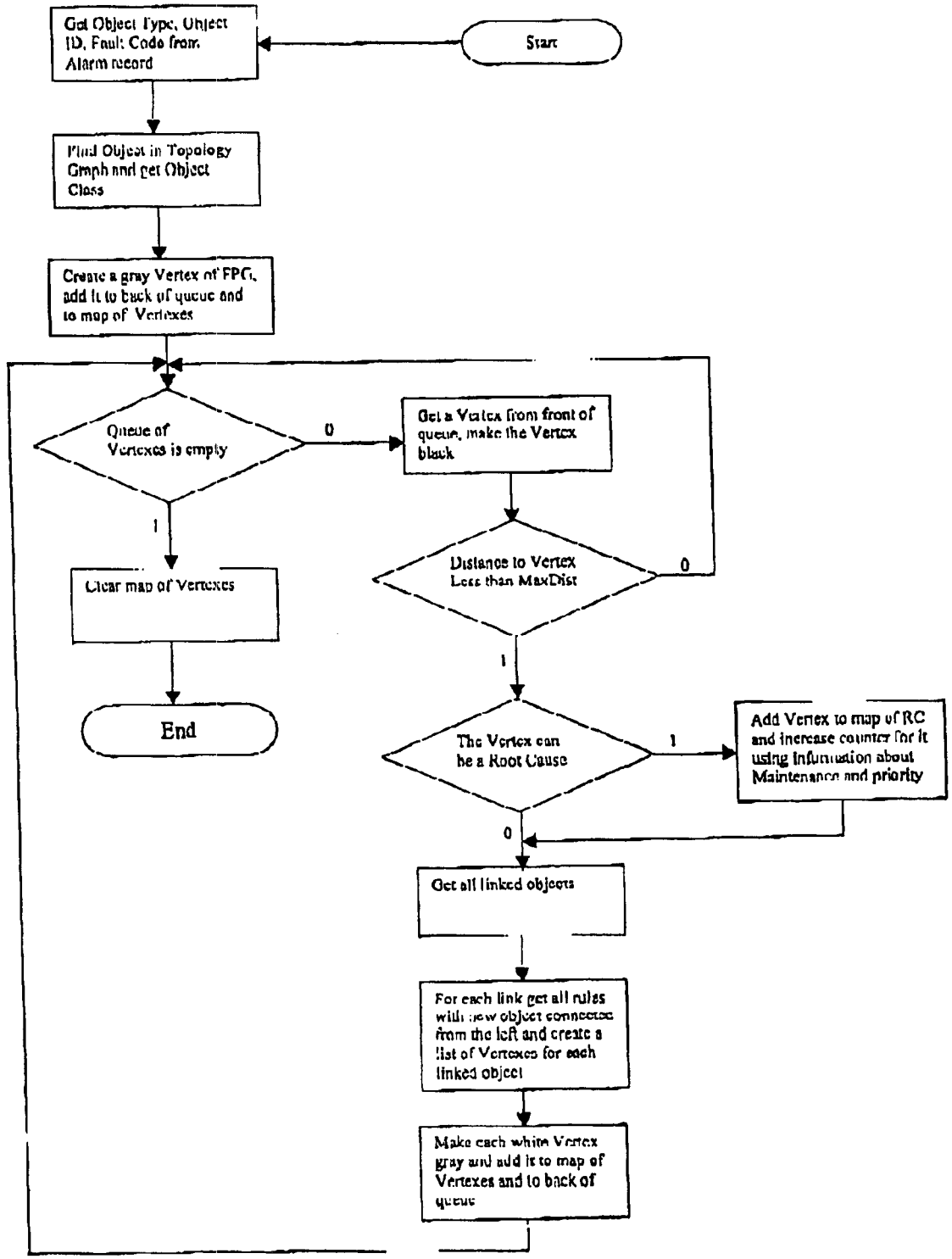
FIG. 14 is a simplified flowchart illustrated of a preferred method for backward traverse for an alarm.

Backward Traverse for an Alarm—preferably as shown in FIG. 14.

Figure 15:
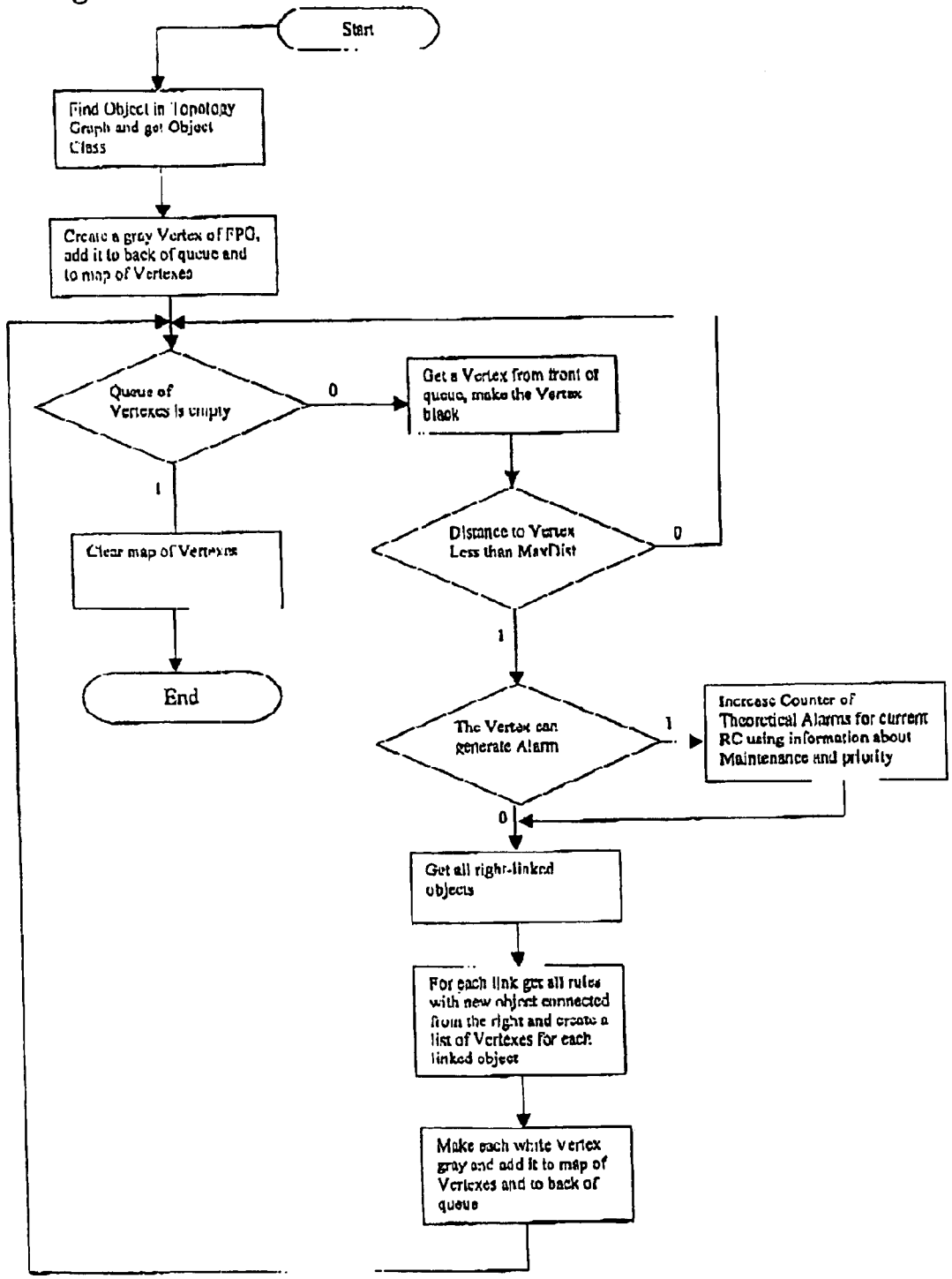
FIG. 15 is a simplified flowchart illustration of a preferred method for forward traverse for a root cause.

Forward Traverse for a root cause—preferably as shown in FIG. 15.

Preferred Confidence Computation Algorithm:
Confidence and Decision
List of Input Alarms:
Let $$X=\{A_1, A_2, \ldots, A_x\}$$

be the set of vertices of graph FPG, corresponding to the set of incoming (input) alarms.

Initial List of Possible Decisions:

As initial list of possible decisions (root causes) $C_1$, $C_2, \ldots, C_I$ ($C_I$ is a vertex of FPG) for the input set $X=\{A_1, A_2, \ldots, A_x\}$ we take the set of simple (not compound) root causes $C_i$ that in its prototype set $S_i$ there is at least one vertex from the input set X (i.e. $S_i \cap X \neq \emptyset$). All such root causes (and only such root causes) are achieved during the procedure of Backward Traverse.

Confidence:

Let $C_1, C_2, \ldots C_I$ be a given list of possible solutions: a list of simple or compound root causes with known a priori probabilities $P(C_I)$, $i=1, 2, \ldots, I$, and prototype sets $S_1$, $S_2, \ldots, S_I$.

Denote by $x=|X|$ the number of incoming alarms, $s=s_I=|S_I|$ the number of alarms in prototype $S=S_I$ of root cause $C=C_i$, $Y=Y_i=S_i \cap X$ the subset of the incoming alarms lying in prototype $S_i$, $y=y_i=|Y_i|$ the number of incoming alarms lying in prototype $S_i$.

For every directed arc $(V_1, V_2)$ of FPG, the value of $p(V_1, V_2)$, the fault propagation probability from vertex $V_1$ to vertex $V_2$, is presented in the corresponding record of Fault Induction Table. The fault propagation probability $p(V_1, V_2, \ldots, V_m)$ along directed path $(V_1, V_2, \ldots V_m)$ is defined by $$p(V_1, V_2, \ldots, V_m)=p(V_1, V_2) \cdot p(V_1, V_3), \ldots, p(V_{m-1}, V_m).$$

The path with the maximal fault propagation probability $p(V_1, V_2, \ldots, V_m)$ among all paths $(V_1, V_2, \ldots, V_m)$ connecting root cause $C_i$ and alarm $A_j$ (with $V_1=C_i$ and $V_m=A_j$) is computed in the process of the Forward Traverse by computing the shortest path in FPG between root cause $C_i$ and alarm $A_j$, when "length" of arc $(V_1, V_2)$ is defined by Length $(V_1, V_2)$—ln $p(V_1, V_2)$.

Denote by $d(C_i, A_j)$ (the distance from root cause $C_i$ to alarm $A_j$) the length of this shortest path between $C_i$ and $A_j$.

For given root cause $C_i$ and input set of alarms $X=\{A_1, A_2, \ldots, A_x\}$, the Forward Traverse finds value:

$$D(C_i, Y_i) = \sum_{i:A_j \in Y_i} d(C_i, A_j)$$

of the sum of the distances from root cause $C_i$ to all $y=y_i$ input alarms lying in the prototype, and
the average distance $$\bar{d}(C_i, Y_i) = D(C_i, Y_i)/y_i$$

from root cause $C_l$ to incoming alarms lying in the prototype.

In the case of compound cause C composed of two simple root cause $C_{11}$ and $C_{12}$, distance $d(C, A_j)$ from root cause C to alarm $A_j$ is defined (during the Forward Traverse) by $$d(C, A_j) = \min(d(C_{11}, A_j), d(C_{12}, A_j)),$$

and then the value $$D(C, Y) = \sum_{i:A_j \in Y} d(C, A_j),$$

where $Y=Y_{11} \cup Y_{12}$, is computed based on distances $d(C, A_j)$.

Denote by q(A) the value of "preference" of alarm A (see Alarm Table in 3.1), $$Q(Y_i) = \sum_{i:A_j \in Y_i} q(A_j)$$

the value of comulative preference of incoming alarms lying in prototype $Y_i$ of root cause $C_l$, $$Q(S_i) = \sum_{i:A_j \in Y_i} q(A_j)$$

the cumulative preference of all (expected) alarms lying in prototype of root cause $C_l$, and $$Q(X) = \sum_{i:A_j \in X} q(A_j)$$

the cumulative preference of all incoming alarms.

The values $Q(Y_i)$ and $Q(Y_i)$ are computed during the Forward Traverse for every root cause. The constant $Q(X)$ is independent of root causes and will not influence choose of a suitable root cause.

The nonnormalized and normalized confidence of decision $C_l$ in the set of decisions $C_1, C_2, \ldots, C_l$ is computed by the following formulas:

a. For each root cause $C_i$, compute nonnormalized confidence $$W(X \mid C_i) = \left(\frac{Q(Y_i)}{Q(S_i)}\right)^\alpha \cdot \left(\frac{Q(Y_i)}{Q(X)}\right)^\beta \cdot \left(\frac{1}{d(C_i, Y_i)}\right)^\gamma,$$

of root cause $C_l$, where weights $\alpha, \beta, \gamma$ are parameters:

$$\alpha \geq 0, \beta \geq 0, \gamma \geq 0,$$

$\alpha$ is a weight for ratio $$\left(\frac{Q(Y_i)}{Q(S_i)}\right)$$

of the preference of the incoming alarms lying in the prototype to the preference of all alarms in the prototype;

$\beta$ is a weight for ratio $$\left(\frac{Q(Y_i)}{Q(X)}\right)$$

of the preference of the incoming alarms lying in the prototype to the preference of all incoming alarms;

$\gamma$ is a weight for value $$\left(\frac{1}{d(C_i, Y_i)}\right)$$

characterizing closeness (in the sense of the fault propagation) of the subset of incoming alarms $Y_i$ lying in the prototype to root cause $C_l$.

b. Compute the normalizing value $$W(X) = \sum_{i=1}^{i} P(C_i) W(X \mid C_i),$$

c. For $i=1, 2, \ldots, I$ compute normalized confidence $$P(C_l \mid X) = \frac{P(C_l) W(X \mid C_l)}{W(X)}.$$

Compare Confidences:

a. Normalized confidences $P(C_i|X)$ of solutions $C_1, C_2, \ldots, C_I$ are compared to predefined threshold $T_1$ ($T_1 \geq 50\%$), and if $$P(C_l|X) > T_l$$

for some l, one root cause $C_l$ is admitted as a "statement" output (vs. a recommendation).

b1. If $P(C_i|X) \leq T_1$ for all $i=1, 2, \ldots, I$, but $$P(C_l|X) > T_2$$

for $l=l_1, l_2, \ldots, l_r$, where $T_2$ ($T_2 > T_1$) is the second predefined threshold, and $$\sum_{k=1}^{r} P(C_{t_4} \mid X) > T_1$$

then r root causes $C_{t1}, C_{t2}, \ldots, C_{tr}$, are declared as "statement" outputs.

b.2. If $P(C_i|X) \leq T_1$ for all $i=1, 2, \ldots, I$, but $$P(C_l|X) > T_2$$

for $l=l_1, l_2, \ldots, l_r$, where $T_2$ ($T_2 < 50\%$) is the second predefined threshold, and $$\sum_{k=1}^{r} P(C_{t_k} | X) \le T_1$$

then r root causes $C_{t1}$, $C_{t2}$, ..., $C_i$, are admitted as recommendations.

c. If $P(C_i|X) \le T_3$ for all i=1, 2, ..., I, where $T_3$ ($T_3 < T_2$) is the third predefined threshold, then the algorithm is ended without acceptable decision, else those root causes $C_l$ for which $$P(C_l|X) > T_3$$

are chosen to form compound root causes from them: the decisions consisting of the composition of two root causes $C_{t_1}$ and $C_{t_2}$.

Union List of Simple and Compound Root Causes:
a. The union of the initial list from the above section entitled "Initial List of Possible Decision" and the list of compound root causes from the above section entitled "Compare Confidence" is formed.
b. The confidence for this union list of possible decisions are computed according to step 4.3.3.
c. The Step a and Step b from the above section entitled are repeated "Compare Confidence" for the union list of decisions
d. If $P(C_l|X) \le T_2$ for all $C_l$ from the union list, the algorithm is ended without acceptable decision.

Parameters:
The confidence parameters are α, β, γ, where $$\alpha \ge 0, \beta \ge 0, \gamma \ge 0.$$

α is a weight for ratio $$\left(\frac{Q(Y_i)}{Q(S_i)}\right)$$

of the preference of the incoming alarms lying in the prototype to the preference of all alarms in the prototype;
β is a weight for ratio $$\left(\frac{Q(Y_i)}{Q(X)}\right)$$

of the preference of the incoming alarms lying in the prototype to the preference of all incoming alarms;
γ is a weight for value $$\left(\frac{1}{d(C_l, Y_i)}\right)$$

characterizing closeness (in the sense of the fault propagation) of the subset of incoming alarms $Y_i$ lying in the prototype to root cause $C_i$.

Three thresholds are defined as parameters of the decision algorithm:

$T_1$ ($T_1 \ge 50\%$) is a threshold that defines whether the confidences of a root cause is enough to output it as a statement (vs. a recommendation).

$T_2$ ($T_2 < T_1$)—is a threshold that defines the acceptable confidence for outputting a root cause.

$T_3$ ($T_3 < T_2$)—is a threshold that defines the acceptable confidence for a simple root causes to form compound root cause from them.

Set Confidence:
The algorithm for the confidence computation is as follows.
Each Root Cause $$UnnormalizedConfidence[Root\ Cause] = \left(\frac{Q(Y_i)}{Q(S_i)}\right)^\alpha \left(\frac{Q(Y_i)}{Q(X)}\right)^\beta \left(\frac{1}{d(C_l, Y_i)}\right)^\gamma$$

// all expressions were defined above
If(Root Cause is in Maintenance)
  UnnormalizedConfidence[Root Cause]*=GetAPrioriProbability[Root Cause]
  SumOfUnnormalizedConfidence+=UnnormalizedConfidence[Root Cause]
// Normalization
For each Root Cause
  NormalizedConfidence[Root Cause]= UnnormalizedConfidence[Root Cause]/ SumOfUnnormalizedConfidences Preferred Track-Back of Faults
Two mechanisms preferably are used to track back the faults:
1. The decision algorithm preferably store in the faults table the identifications of the dynamic groups that were used to diagnose the fault. From this information, the set of alarms that were processed can be extracted. This information preferably is stored in the correlation history (phase 1b).

Each fault rule will have an ID. When diagnosing a root cause, the rules used by the mechanism preferably is tracked. This information can later on be used to diagnose the rules that were used when the expected alarms vector of the faults was constructed. The information preferably is stored in the correlation history (phase 1b).

Preferred Off-Line Defined Data
Preferred Rules Table:
Our approach to the Alarm Correlation problem is preferably to reduce it into the Problem of Fault Propagation. Therefore we may define the rules that model the Fault Propagation problem.

The rules may not described the physical propagation of errors in the network, but the logic "cause—effect" relations between the various problems in the objects. In general the correlation algorithm imitates the network behaviour and the rules are simulating the flow of the alarms from the root cause to the end equipment. The rules may be generic per technology in order to fit any network.

In order to ease the rules definition, the defined rules may concentrate on two entities related to one another, by a relationship. For example:
1. "contains"
2. "connected"
3. "terminated by"
4. "In route"
5. "pass through"
6. "used by"

The following table illustrates an example of a set of rules that can be defined:

| Object Type 1 | Fault Type 1 | Object Type 2 | Fault Type 2 | Relation |
|---|---|---|---|---|
| Network element | Fault | Card | Fault | Contains |
| Card | Fault | Port | Fault | Contains |

-continued

| Object Type 1 | Fault Type 1 | Object Type 2 | Fault Type 2 | Relation |
|---|---|---|---|---|
| Port | Fault 1 | Fiber | Fault | Connected |
| Cable | Fault | Fiber | Fault | Contains |
| Port | Fault | Port | Fault 2 | Connected |

A rule is defined as a pair of object type and object ID connected by a relation.

The system preferably is developed with basic rules that will cover the high level cases of a network. These rules may not be overridden.

Entities that their relation does not appear in the rules set will not be correlated, since the system will not have any information on their fault propagation.

Figure 16:
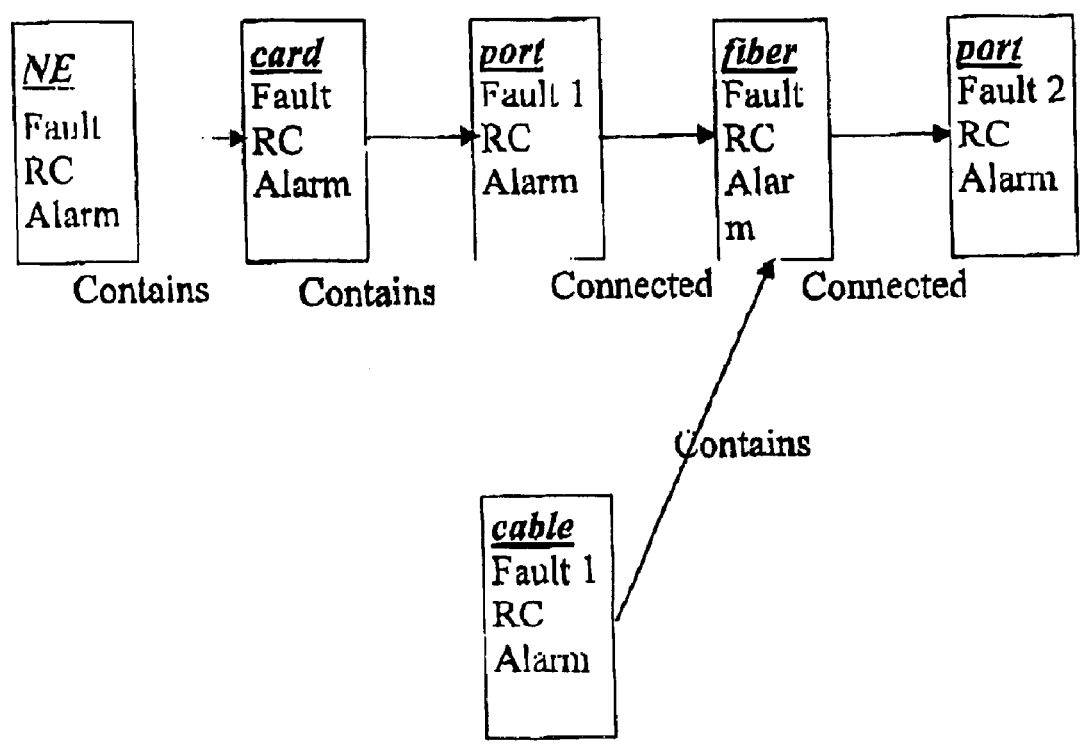
FIG. 16 is a graph of a data set of rules defined off-line in accordance with a preferred embodiment of the present invention.

For illustration purposes, we may construct the pointed graph of FIG. 16 from this basic set of rules Preferred A-Prior Probabilities of Faults:

An a-priori probability preferably is defined for each fault. This probability can be defined based on one or more of the following:
1. A probability taken from the device documentation
2. The average number of faults that have occurred during a defined period in the past.
3. The average time of fault during a defined time period.
4. Questionnaire for relative probability.

For the general case that the specific faults of a network element are not known, a general "unspecified" fault preferably is defined, and the a-priori probability preferably is of any fault in the network element.

It is emphasized that these values are used for relatively comparing the fault probability of the entities, therefore exact values are not needed.

Figure 17:
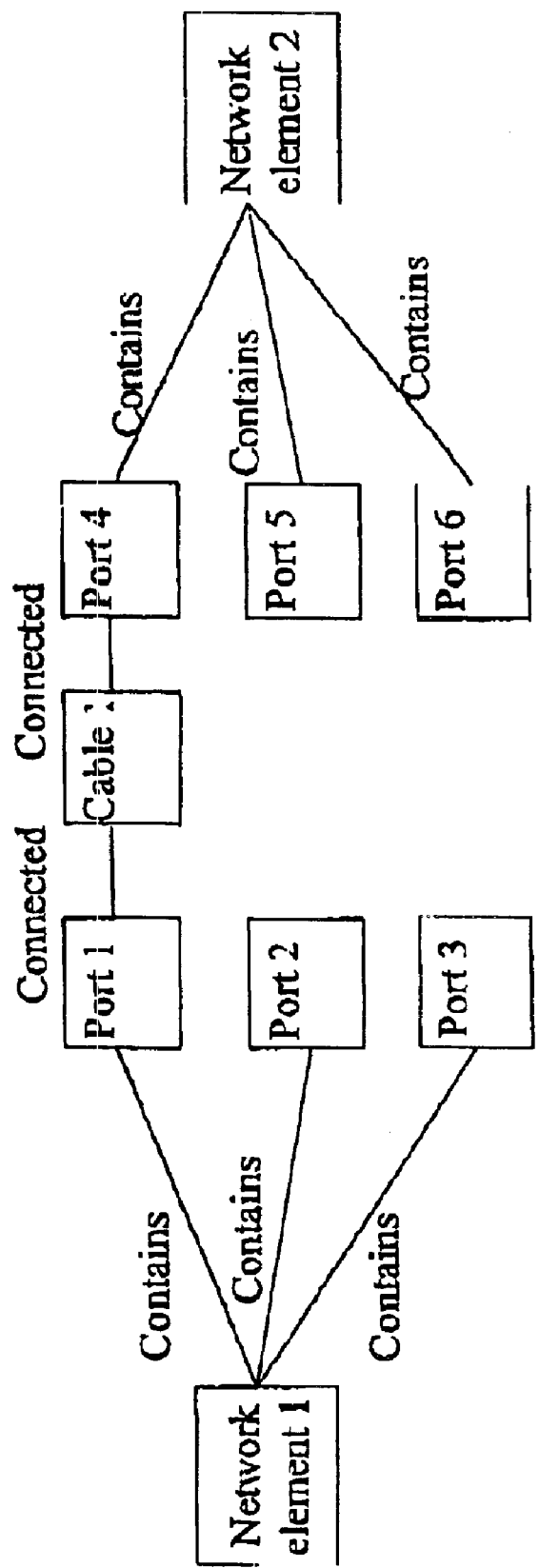
FIG. 17 is a diagram showing a topology graph.

Preferred Construction of the Topology Graph:

The topology graph is preferably a structure in which the vertices are network entities, and the connections represent relations between the entities. The algorithm for construction of the graph (as illustrated in the flow chart a head) reviews the topology table. A vertex is created for each object. A link is created for each of the objects, describing their relation to one another with regards to a specific fault in each of the objects, as shown in FIG. 17.

Preferred Handling Maintenance Status

The following assumptions are preferably made regarding the behavior of the maintenance work:
1. The predicted end time of the maintenance procedure is known.
2. During the maintenance time period, the entities affected by it may be unstable (for example, cards may be inserted and taken out several times). This typically causes alarms to appear and drop during the entire time frame, and not just at the beginning of the maintenance work
3. Alarms may be related both to maintenance and to other network problems. In terms of the decision algorithm, alarms may be children of both maintenance and other root causes. Therefore, it is not logical to automatically filter out maintenance alarms.

The maintenance status of each network entity preferably is stored in the following table:

| Field | Description |
|---|---|
| Object type | Topology entity group classification |
| Object ID | Topology entity identification |
| Start time | Maintenance start time |
| End time | Maintenance end time |

The following procedure preferably is implemented for maintenance work:
1. Once the maintenance table is loaded (periodically), a root cause is generated (internally in the decision algorithm) for each maintenance activity, and a list of expected alarms is computed (By "forward traverse").
2. After a set of root causes is generated for a given set of alarms (By "backward traverse"), each root caused is compared with the expected list of root causes. If a match is found, the a-priori probability of the root cause is set to 100%, and the confidence of the root cause is computed normally.
3. Child alarms of a maintenance root cause are typically be linked to the same maintenance root cause instance.
4. Alarms that were identified as independent will always be checked with the list of expected alarms for the maintenance root causes. This is done in order to associate an alarm or several alarms with a maintenance root cause, even if that root cause was generated hours ago.

Maintenance root causes (parent and derived), preferably is sent to the clients with a special flag. Thus enabling the view and suppression of such parent and child alarms.

If a maintenance root cause exists after the maintenance end time, it preferably is escalated to a normal alarm.

An example of a "TRS rule" is that if entity Blue has an alarm type A and has at least one relationship X (e.g. "connected to", "contained in", etc.) to entity Green, then entity Blue causes alarm type B in the Green entity. The term "IRS rule", referring to the rules which govern operation of the TRS, is also termed herein a "relationship".

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons in the art that the present invention is not limited to what has been particularly shown and described hereinabove. Rather, the scope of the present invention is defined only by the claims that follow:

What is claimed is:

1. A root cause analysis system operative in conjunction with fault management apparatus, the system comprising:
   a topology-based reasoning system (TRS) operative to topologically analyze alarms in order to identify at least one root cause thereof,
   wherein conditional probabilities derived from assuming that various probable causes are the root cause, are compared, in order to select one of the probable causes as the root cause.

2. A system according to claim 1 wherein said probable causes comprise faults in a network.

3. A system according to claim 1 wherein said probable causes comprise faults in a data communications network.

4. A system according to claim 1 and also comprising fault management apparatus.

5. A system according to claim 1 and also comprising a rule-based expert system (BS) operative to analyze alarms in order to identify root causes thereof.

6. A system according to claim 1 wherein the operation of TRS is at least partly rule-based.

7. A system according to claim 6 wherein at least one rule governing operation of the TRS can be changed without disrupting TRS operation.

8. A system according to claim 1 wherein the operation of TRS is at least partly relation-based.

9. A system according to claim 1 wherein the TRS is operative to represent the topology of a network being analyzed for faults as a graph.

10. A system according to claim 9 wherein said graph is held in memory.

11. A system according to claim 10 wherein said memory comprises random access memory.

12. A system according to claim 9 wherein said TRS is operative to traverse said graph in order to find the root cause and in order to find all the alarms that belong to a root cause.

13. A system according to claim 1 and also comprising a large network whose topology is being analyzed.

14. A system according to claim 13 wherein said large network comprises a national network.

15. A system according to claim 13 wherein said large network compnses a network operated by PTT (post-telecom and telegraph).

16. A system according to claim 1 wherein said TRS is operative to identify root causes for more than one network fault simultaneously.

17. A system according to claim 1 wherein said TRS is operative to check all probable causes before selecting a root-cause.

18. A system according to claim 1 wherein said TRS is operative to make at least one root-cause decision based at least partly on the following parameter:
the distance between the location in the network of the suspected root-cause and the point of origin of each alarm related to it.

19. A system according to claim 1 wherein said TRS is operative to make at least one root-cause decision based at least partly on the following parameter:
the amount of alarms in the incoming group of alarms that are explained by that root-cause.

20. A system according to claim 1 wherein said TRS is operative to make at least one root-cause decision based at least partly on the following parameter:
the amount of alarms received out of all the alarms that system expects for that root cause.

21. A system according to claim 1 wherein said TRS is operative to anticipate at least one expected alarm associated with at least one respective fault type, and wherein said TRS is capable of deciding that at least one particular fault type has occurred, even if less than all of the expected alarms associated with said at least one particular fault type have actually occurred within an incoming alarm stream.

22. A system according to claim 1 wherein said TRS is operative to identify at least one incoming alarm generated by at least one network maintenance activity.

23. A system according to claim 1 wherein said TRS is application independent.

24. A system according to claim 1 wherein said probable causes comprise faults in a telecommunications network.

25. A system according to claim 1 wherein said TRS is operative to analyze at least one incoming alarm to determine a network element associated therewith.

26. A system according to claim 25 wherein said TRS comprises a table storing the manufacturer of each network element and wherein, upon encountering an incoming alarm associated with a network element, said TRS is operative to look up the manufacturer associated with said alarm.

27. A system according to claim 25 wherein said network element comprises a logical object.

28. A system according to claim 25 wherein said network element comprises a physical object.

29. A system according to claim 1 wherein said TRS is operative to identify a first root cause of at least one alarm and subsequently identify a second root cause based on at least one additional alarm which has arrived subsequently.

30. A system according to claim 1 wherein the TRS is operative to represent, using a graph, the topology of an expected alarm flow pattern through a network being analyzed for faults.

31. A system according to claim 1 wherein said TRS is operative to cluster incoming alarms into groups based at least partly on the alarms' time of arrival.

32. A system according to claim 1 wherein said TRS is operative to utilize knowledge regarding a bell-shaped distribution of alarms associated with each fault, in order to cluster alarm into groups each associated with a different fault.

33. A system according to claim 1 wherein said TRS is operative to cluster incoming alarms into groups based at least partly on the topologic distance between the alarms.

34. A system according to claim 1 wherein said TRS is operative to update network topology data on-line, without disruption to TRS operation.

35. A system according to claim 1 and also comprising a rule definition GUI operative to provide a user with a set of rule component options presented in natural language from which a rule can be composed.

36. A system according to claim 1 wherein said TRS automatically adjusts to changing network topology.

37. A system according to claim 1 wherein said TRS is part of a network control system.

38. A system according to claim 1 and also comprising an event stream including a sequence of events, less than all of which are deemed alarms, and wherein said TRS can be connected to the event stream directly.

39. A system according to claim 1 wherein said TRS imitates the flow of alarms in the network, thereby allowing anyone with good knowledge of the alarm flow in a given network type to generate the rules for that network type.

40. A system according to claim 1 wherein said TRS issues 'derived' alarms to describe root causes when no incoming alarm accurately does so.

41. A system according to claim 1 wherein said TRS results are sent to a fault management GUI without requiring the operator to look at a separate correlation screen.

42. A system according to claim 1 wherein said TRS stores its decision results in a history database, thereby allowing users to review the decision results and associated alarm groups, after the faults that generated these decisions and alarm groups have already been resolved.

43. A system according to claim 1 wherein said TRS comprises a rule set.

44. A root cause analysis method operative in conjunction with fault management apparatus, the method comprising:
performing topology-based reasoning including topologically analyzing alarms in order to identify at least one root cause thereof; and adapting said topology-based reasoning for use with a different type of network by adding at least one rule to an existing rule set employed in the course of said performing topology-based reasoning.

45. A method according to claim 44 and also comprising providing an output indication of at least one identified root cause.

46. A system according to claim 45 wherein said rule set comprises a first rule associated with a first network element manufacturer and a second rule associated with a second network element manufacturer.

47. A root cause analysis system operative in conjunction with fault management apparatus, the system comprising:

a topology-based reasoning system (TRS) operative to topologically analyze alarms in order to identify at least one root cause thereof, wherein said TRS is operative to make at least one root-cause decision based at least partly on the following parameter:

the distance between the location in the network of the suspected root-cause and the point of origin of each alarm related to it.

48. A root cause analysis system operative in conjunction with fault management apparatus, the system comprising:

a topology-based reasoning system (TRS) operative to topologically analyze alarms in order to identify at least one root cause thereof, wherein said TRS is operative to make at least one root-cause decision based at least partly on the following parameter:

the amount of alarms received out of all the alarms that system expects for that root cause.

49. A root cause analysis system operative in conjunction with fault management apparatus, the system comprising:

a topology-based reasoning system (TRS) operative to topologically analyze alarms in order to identify at least one root cause thereof, wherein said TRS is operative to identify at least one incoming alarm generated by at least one network maintenance activity.

50. A root cause analysis system operative in conjunction with fault management apparatus, the system comprising:

a topology-based reasoning system (TRS) operative in topologically analyze alarms in order to identify at least one root cause thereof; and an event stream including a sequence of events, less than all of which are deemed alarms, wherein said TRS can be connected to the event stream directly.

51. A root cause analysis system operative in conjunction with fault management apparatus, the system comprising:

a topology-based reasoning system (TRS) operative in topologically analyze alarms in order to identify at least one root cause thereof, wherein said TRS imitates the flow of alarms in the network, thereby allowing anyone with good knowledge of the alarm flow in a given network type to generate the rules for that network type.

* * * * *